United States Patent
Hwang et al.

(10) Patent No.: US 10,595,099 B2
(45) Date of Patent: *Mar. 17, 2020

(54) METHOD AND DEVICE FOR TRANSMITTING AND RECEIVING BROADCAST SIGNAL FOR BROADCAST SERVICE ON BASIS OF XML SUBTITLE

(71) Applicant: LG ELECTRONICS INC., Seoul (KR)

(72) Inventors: Soojin Hwang, Seoul (KR); Sejin Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/556,512

(22) PCT Filed: Aug. 31, 2015

(86) PCT No.: PCT/KR2015/009112
§ 371 (c)(1),
(2) Date: Sep. 7, 2017

(87) PCT Pub. No.: WO2016/163603
PCT Pub. Date: Oct. 13, 2016

(65) Prior Publication Data
US 2018/0054660 A1 Feb. 22, 2018

Related U.S. Application Data

(60) Provisional application No. 62/143,173, filed on Apr. 5, 2015.

(51) Int. Cl.
*G11B 20/10* (2006.01)
*G11B 20/00* (2006.01)
(Continued)

(52) U.S. Cl.
CPC ....... *H04N 21/8543* (2013.01); *H04N 21/234* (2013.01); *H04N 21/235* (2013.01); *H04N 21/435* (2013.01); *H04N 21/4884* (2013.01)

(58) Field of Classification Search
None
See application file for complete search history.

(56) References Cited

U.S. PATENT DOCUMENTS 5,684,542 A * 11/1997 Tsukagoshi ............ G06T 9/005
348/462
9,465,996 B1 * 10/2016 Greene ............ H04N 21/4334
(Continued)

FOREIGN PATENT DOCUMENTS

KR 10-2010-0046229 A 5/2010
KR 10-2012-0063431 A 6/2012
(Continued)

*Primary Examiner* — Nasser M Goodarzi
*Assistant Examiner* — Terrika Peterson
(74) *Attorney, Agent, or Firm* — Dentons US LLP

(57) ABSTRACT

The present invention relates to a method and/or a device for transmitting and receiving a broadcast signal for a broadcast service on the basis of an XML subtitle. The method for transmitting a broadcast signal, according to one embodiment of the present invention, comprises the steps of: encoding video data, subtitle data, and signaling information including metadata related to the subtitle data; generating a broadcast signal including the encoded video data, subtitle data, and signaling information; and transmitting the generated broadcast signal.

16 Claims, 31 Drawing Sheets

(51) Int. Cl.
*H04N 13/183* (2018.01)
*H04N 21/64* (2011.01)
*H04N 5/278* (2006.01)
*H04N 21/8543* (2011.01)
*H04N 21/234* (2011.01)
*H04N 21/235* (2011.01)
*H04N 21/435* (2011.01)
*H04N 21/488* (2011.01)
*H04N 19/46* (2014.01)
*H04N 7/025* (2006.01)

(56) References Cited

U.S. PATENT DOCUMENTS

| | | | | |
|---|---|---|---|---|
| 10,368,144 | B2* | 7/2019 | Oh | H04N 21/234 |
| 10,419,718 | B2* | 9/2019 | Oh | H04N 21/235 |
| 2004/0233938 | A1* | 11/2004 | Yamauchi | H04N 21/2365 |
| | | | | 370/537 |
| 2004/0233996 | A1* | 11/2004 | Jung | G11B 20/10527 |
| | | | | 375/240.26 |
| 2005/0117799 | A1* | 6/2005 | Fuh | G06T 5/009 |
| | | | | 382/169 |
| 2006/0021060 | A1* | 1/2006 | Fujinami | G11B 20/00086 |
| | | | | 726/26 |
| 2006/0204092 | A1* | 9/2006 | Hamasaka | G11B 27/11 |
| | | | | 382/173 |
| 2008/0192819 | A1* | 8/2008 | Ward | G06T 5/009 |
| | | | | 375/240.02 |
| 2008/0212938 | A1* | 9/2008 | Sato | A63F 13/02 |
| | | | | 386/239 |
| 2010/0128799 | A1* | 5/2010 | Takahashi | H04N 5/278 |
| | | | | 375/240.25 |
| 2011/0019088 | A1* | 1/2011 | Kase | H04N 5/44513 |
| | | | | 348/468 |
| 2011/0119709 | A1* | 5/2011 | Kim | H04N 13/004 |
| | | | | 725/39 |
| 2011/0134991 | A1* | 6/2011 | Gregotski | H04N 21/64715 |
| | | | | 375/240.01 |
| 2011/0242104 | A1* | 10/2011 | Zhang | H04N 13/183 |
| | | | | 345/419 |
| 2012/0206567 | A1* | 8/2012 | Zafarifar | H04N 7/025 |
| | | | | 348/42 |
| 2013/0114000 | A1* | 5/2013 | Atkins | H04N 5/20 |
| | | | | 348/708 |
| 2013/0191861 | A1* | 7/2013 | Sasaki | H04N 21/236 |
| | | | | 725/32 |
| 2013/0263193 | A1* | 10/2013 | Hirano | H04N 21/2387 |
| | | | | 725/88 |
| 2015/0256846 | A1* | 9/2015 | Hattori | H04N 19/46 |
| | | | | 375/240.16 |
| 2016/0150180 | A1* | 5/2016 | Kozuka | H04N 5/913 |
| | | | | 386/254 |
| 2016/0163356 | A1* | 6/2016 | De Haan | H04N 21/234327 |
| | | | | 386/241 |
| 2016/0353123 | A1* | 12/2016 | Ninan | H04N 5/2355 |
| 2017/0180767 | A1* | 6/2017 | Oh | H05K 999/99 |
| 2017/0251161 | A1* | 8/2017 | Toma | H04N 5/765 |
| 2018/0103258 | A1* | 4/2018 | Chen | H04N 19/46 |
| 2018/0115777 | A1* | 4/2018 | Piramanayagam | G06T 5/007 |
| 2019/0110054 | A1* | 4/2019 | Su | G06T 5/008 |

FOREIGN PATENT DOCUMENTS

| | | |
|---|---|---|
| KR | 10-2013-0056829 A | 5/2013 |
| KR | 10-2014-0019335 A | 2/2014 |
| WO | 2014/073853 A1 | 5/2014 |
| WO | WO-2016159636 A1 * | 10/2016 ............ H04N 5/278 |

* cited by examiner

FIG. 5

```
<tt:tt ttp:timeBase = "media" xml:lang= "en">
  <tt:head>
    <tt:metadata>
      <ebuttm:documentMetadata
        ebuttm:documentTargetAspectRatio
        ebuttm:RefGamut = "BT2020"
        ebuttm:RefDynamicRange = 2000 100 200000
        ebuttm:EOTF = "SMPTE2084"
        ebuttm:RefBitDepth = 12
        .... />
    </tt:metadata>
    <tt:styling>
      <tt:style xml:id= "BaseStyle" tts:color = "red" , ebutts:colorExtent = "0F040A" tts:backgroundColor = "yellow" ebutts:backgroundColorExtent = "010803" ..... />
      <tt:style xml:id= "Style1" tts:textAlign = "start" ..... />
    </tt:styling>
    <tt:layout>
      <tt:region xml:id ="region1" tts:origin="0% 0%" tts:extent="50% 100%" .... />
    </tt:layout>
  </tt:head>
  <tt:body>
    <tt:div style = "BaseStyle">
      <tt:p region = "region1" style = "Style1" begin= "00:00:00:00" end="00:00:01:00"> text line 1 </tt:p>
    </tt:div>
  </tt:body>
</tt:tt>
```

FIG. 6

```
ebuttm:RefGamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+                        // value = originalValue   *10000
```

```
<namedGamut>
  : "BT709"    // 6400  3300  3000  6000  1500   600  3127  3290
  | "BT2020"   // 7080  2920  1700  7970  1310  4600  3127  3290
```

(a)

```
ebuttm:RefDynamicRange
  : PeakBrightness BlackLevel ContrastRatio
  | <namedDynamicRange>

PeakBrightness | BlackLevel | ContrastRatio
  : <digit>+ // BlackLevel = OriginalValue *10000;
```

```
<namedDynamicRange>
  : "SMPTERefHD"              // 100  500  200
```

(b)

```
ebuttm:EOTF
  :<namedEOTF>
```

```
<namedEOTF>
  : "BT1886"
  | "SMPTE2084"
```

```
ebuttm:RefBitDepth
   : <digit>+  // valid range: [1,16]
```

(a)

```
<ebuttdt:distributionColorType>
   : "#" rrggbb  | "#" rrggbbaa
rrggbb
   : hexDigit{6}
rrggbbaa
   : hexDigit{8}
hexDigit
   : [0-9] | [a-f] | [A-F]
```

(b)

```
ebuttds:colorExtent
   :<ebuttdt:distributionColorType>
```

```
<color>
    : "#" rrggbb
    | "#" rrggbbaa
    | "rgb" "(" r-value "," g-value "," b-value ")"
    | "rgba" "(" r-value "," g-value "," b-value "," a-value ")"
    | <namedColor>
rrggbb
    : <hexDigit>{6}
rrggbbaa
    : <hexDigit>{8}
r-value | g-value | b-value | a-value
    : component-value
component-value
    : non-negative-integer // valid range: [0,255]
non-negative-integer
    : <digit>+
```

(a)

```
tts:colorExtent
    :<color>
```

(b)

```
<tt:style  tts:color = "rgb(255,0,0)", tts:colorExtent = "rgb(15,4,10)".... />
```

```
<tt:style tts:color = "red", tts:colorExtent = "0F040A". /> <
```

```
<tt:tt ttp:timeBase = "media" xml:lang= "en">
  <tt:head>
    <tt:metadata>
      <ebuttm:documentMetadata
        ....
        ebuttm:documentTargetAspectRatio
        ebuttm:Gamut = "BT709"
        ebuttm:DynamicRange = 100 500 2000
        ebuttm:EOTF = "BT1886"
        ebuttm:BitDepth = 8
        ebuttm:SupplementaryGamut = "BT2020"
        ebuttm:SupplementaryDynamicRange = 2000 100 200000 500 100
        ebuttm:SupplementaryEOTF = "SMPTE2084"
        ebuttm:SupplementaryBitDepth = 12
        .... />
    </tt:metadata>
    <tt:styling>
      <tt:style xml:id = "BaseStyle" tts:color = "red" tts:backgroundColor = "yellow" .... />
      <tt:style xml:id= "Style1" tts:color = "rrggbb", tts:colorSupplementary = "#RRRGGGBBB" tts:backgroundColor = "r'r'g'b'b'" tts:backgroundColorSupplementary= "#-R'R'R'G'G'G'B'B'B'" .... />
    </tt:styling>
    <tt:layout>
      <tt:region xml:id= "region1" tts:origin="0% 0%" tts:extent="50% 100%" .... />
    </tt:layout>
  </tt:head>
  <tt:body>
    <tt:div style = "BaseStyle">
      <tt:p region = "region1" style = "Style1" begin= "00:00:00:00" end="00:00:01:00"> text line 1 </tt:p>
    </tt:div>
  </tt:body>
</tt:tt>
```

FIG. 13

```
<tt:tt ttp:timeBase = "media" xml:lang= "en">
  <tt:head>
    <tt:metadata>
      <ebuttm:documentMetadata
      ....
        ebuttm:documentTargetAspectRatio
        ebuttm:Gamuts = "BT709" "BT2020"
        ebuttm:DynamicRanges = 100 500 2000 2000 100 200000 500 100
        ebuttm:EOTFs = "BT1886" "SMPTE2084"
        ebuttm:BitDepths = 8 12
        ebuttm:ColorTransformation= "video" "function" "linear" 500
        .... />
    </tt:metadata>
    <tt:styling>
      <tt:style xml:id = "BaseStyle" tts:color = "red tts:backgroundColor = "yellow" .... />
      <tt:style xml:id= "Style1" tts:textAlign = "start" .... />
    </tt:styling>
    <tt:layout>
      <tt:region xml:id= "region1" tts:origin="0% 0%" tts:extent="50% 100%" .... />
    </tt:layout>
  </tt:head>
</tt:tt>
```

FIG. 14

```
ebuttm:Gamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+          // value = originalValue *10000
```

```
ebuttm:SupplementryGamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+          // value = originalValue *10000
```

```
<namedGamut>
  : "BT709"    // 6400 3300 3000 6000 1500 600 3127 3290
  | "BT2020"   // 7080 2920 1700 7970 1310 4600 3127 3290
```

(a)

```
ebuttm:Gamuts
 : xRed yRed xGreen yGreen xBlue yBlue xWhite yWhite
   xRed2 yRed2 xGreen2 yGreen2 xBlue2 yBlue2 xWhite2 yWhite2
   | <namedGamut> <namedGamut>
   | <namedGamut> xRed2 yRed2 xGreen2 yGreen2 xBlue2 yBlue2 xWhite2 yWhite2
   | xRed yRed xGreen yGreen xBlue yBlue xWhite yWhite <namedGamut> xRed | yRed | xGreen | yGreen | xBlue | yBlue | xWhite | yWhite |
xRed2 | yRed2 | xGreen2 | yGreen2 | xBlue2 | yBlue2 | xWhite2 | yWhite2
  : <digit>+          // value = originalValue *10000
```

```
ebuttm:DynamicRange
  : PeakBrightness BlackLevel ContrastRatio HighTone? LowTone?
  | <namedDynamicRange>

PeakBrightness | BlackLevel | ContrastRatio | HighTone | LowTone
  : <digit>+     // BlackLevel = OriginalValue *10000;
```

```
ebuttm:SupplementaryDynamicRange
  : PeakBrightness BlackLevel ContrastRatio HighTone? LowTone?
  | <namedDynamicRange>

PeakBrightness | BlackLevel | ContrastRatio | HighTone | LowTone
  : <digit>+     // BlackLevel = OriginalValue *10000;
```

```
<namedDynamicRange>
  : "SMPTERefHD"    // 100 500 200
```

(a)

```
ebuttm:DynamicRanges
  : PeakBrightness BlackLevel ContrastRatio PeakBrightness2 BlackLevel2 ContrastRatio2 HighTone? LowTone?
  | <namedDynamicRange> <namedDynamicRange> HighTone? LowTone?
  | <namedDynamicRange> PeakBrightness2 BlackLevel2 ContrastRatio2 HighTone? LowTone?
  | PeakBrightness BlackLevel ContrastRatio <namedDynamicRange> HighTone? LowTone?

PeakBrightness | BlackLevel | ContrastRatio | PeakBrightness2 | BlackLevel2 | ContrastRatio2 | HighTone | LowTone
  : <digit>+     // BlackLevel = OriginalValue *10000;
```

(b)

FIG. 16 ebuttm:EOTF
 :<namedEOTF> ebuttm:SupplementaryEOTF
 :<namedEOTF>

Ebuttm:EOTFs
 :<namedEOTF> <namedEOTF>

<namedEOTF>
 : "BT1886"
 | "SMPTE2084"

(a)

ebuttm:BitDepth
 : <digit>+         // valid range: [1,16]

ebuttm:SupplementaryBitDepth
 : <digit>+         // valid range: [1,16]

Ebuttm:BitDepths
 : <digit>+ <digit>+   // valid range: [1,16]

```
<tt:style xml:id = "BaseStyle" tts:color = "red tts:backgroundColor = "yellow" .... />
```

(a)

```
<tt:style xml:id= "Style1" tts:color = "#rrggbb", tts:colorSupplementary = "#RRRGGGBBB".... />
```

```
<ebuttdt:distributionColorTypeExtension12>
  : "#" rrrgggbbb  | "#" rrrgggbbbaaa
  rrrgggbbb
     : hexDigit{9}
  rrrgggbbbaaa
     : hexDigit{12}
  hexDigit
     : [0-9] | [a-f] | [A-F]
```

```
<ebuttdt:distributionColorTypeExtension16>
  : "#" rtrrgnggbbbb  | "#" rrrrggggbbbbaaaa
  rrrrggbgbbbb
     : hexDigit{12}
  rrrrggggbbbbaaaa
     : hexDigit{16}
  hexDigit
     : [0-9] | [a-f] | [A-F]
```

<tt:style xml:id= "Style1" tts:backgroundColor = "r'r'g'g'b'b' " tts:backgroundColorSupplementary= "#-R'R'R'G'G'G'B'B'B'".... />

<ebuttdt:distributionColorDifferenceTypeExtension12>
: "#" sign rrrgggbbb | "#" sign rrrgggbbbaaa
sign
 : "+" | "-"
rrrgggbbb
 : hexDigit{9}
rrrgggbbbaaa
 : hexDigit{12}
hexDigit
 : [0-9] | [a-f] | [A-F]

< ebuttdt:distributionColorDifferenceTypeExtension 16>
: "#" sign rtrrgnggbbbb | "#" sign rrrrggggbbbbaaaa
sign
 : "+" | "-"
rrrrggbgbbbb
 : hexDigit{12}
rrrrggggbbbbaaaa
 : hexDigit{16}
hexDigit
 : [0-9] | [a-f] | [A-F]

FIG. 19

```
ebuttm:ColorTransformation
   : CGoption DRoption CGdetail? DRdetail?
CGoption
   : "video" | "tone" | "LUT" | "function"   Number?
DRoption
   : "video" | "tone" | "LUT" | "function"   Number? Type? HighTone? LowTone?
CGdetail
   : for(i=0; i<Number ; i++)  <digit>+ <digit>+ <digit>+ <digit>+ <digit>+ <digit>+     // e.g. RGB to RGB LUT
   | for(i=0; i<Number ; i++)  <digit>+                  // transformation function coefficient
DRdetail
   : for(i=0; i<Number ; i++)  <digit>+ <digit>+      // LUT
   | for(i=0; i<Number ; i++)  <digit>+         // transformation function coefficient
Number
   : <digit>+
HighTone
   : <digit>+           // nit 단위
LowTone
   : <digit>+           // nit 단위, LowTone = OriginalValue *10000;
Type
   : linear | exp | piecewise linear | log | s-curve
```

FIG. 21

| syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0;i<N;i++) { | | |
|         descriptor ( ) | | |
|     } | | |
|     for (i=0;i<N;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0;i<N;i++) { | | |
|             descriptor ( ) | | |
|         } | | |
|     } | | |
|     CRC_32 | 32 | rpchof |
| } | | |

— L21010

| syntax | No. of bits | Identifier |
|---|---|---|
| adaptation_field_data_descriptor ( ) { | | |
|     descriptor_tag | 8 | uimsbf |
|     descriptor_length | 8 | uimsbf |
|     descriptor_field_data_identifier | 8 | bslbf |
| } | | |

— L21020

| adaptation_field_data_identifier(Bit number) | Description |
|---|---|
| $b_0$ | announcement switching data field (TS 101 154[9]) |
| $b_1$ | AU_information data field (TS 101 154[9]) |
| $b_2$ | PVR_assist_information_data_field (TS 101 154[9]) |
| $b_3$ | tsap_timeline (DVB BlueBook A 167-2 [i. 10]) |
| $b_4$ | reserved_0 for future use |
| $b_5$ | XML_subtitle_assist_information_data_field |
| $b_6$ | reserved_0 for future use |
| $b_7$ | reserved_0 for future use |

| syntax | No. of bits | Mnemonic |
|---|---|---|
| adaptation_field ( ) { | | |
|     adaptation_field_length | 8 | uimsbf |
|     if(adaptation_field_length>0) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | 1 | bslbf |
|         if(PCR_flag=='1') { | | |
|             program_clock_reference_base | 33 | uimsbf |
|             reserved | 6 | bslbf |
|             program_clock_reference_extension | 9 | uimsbf |
|         } | | |
|         if(OPCR_flag=='1') { | | |
|             original_program_clock_reference_base | 33 | uimsbf |
|             reserved | 6 | bslbf |
|             original_program_clock_reference_extension | 9 | uimsbf |
|         } | | |
|         if(splicing_point_flag=='1') { | | |
|             splice_countdown | 8 | tcimsbf |
|         } | | |
|         if(transport_private_data_flag=='1') { | | |
|             transport_private_data_length | 8 | uimsbf |
|             for(i=0;i<transport_private_data_length; I++) { | | |
|                 private_data_byte ~ L22010 | 8 | bslbf |
|             } | | |
|         } | | |
|         if(adaptation_field_extension_flag=='1') { | | |
|             adaptation_field_extension_length ~ L22020 | 8 | uimsbf |
|             ltw_flag | 1 | bslbf |
|             piecewise_rate_flag | 1 | bslbf |
|             seamless_splice_flag | 1 | bslbf |
|             reserved ~ L22030 | 5 | bslbf |
|             if(ltw_flag=='1') { | | |
|                 ltw_valid_flag | 1 | bslbf |
|                 ltw_offset | 15 | uimsbf |
|             } | | |
|             if(piecewise_rate_flag=='1') { | | |
|                 reserved | 2 | bslbf |
|                 piecewise_rate | 22 | uimsbf |
|             } | | |
|             if(seamless_splice_flag=='1') { | | |
|                 splice_type | 4 | bslbf |
|                 DTS_next_AU[32..30] | 3 | bslbf |
|                 marker_bit | 1 | bslbf |
|                 DTS_next_AU[29..15] | 15 | bslbf |
|                 marker_bit | 1 | bslbf |
|                 DTS_next_AU[14..0] | 15 | bslbf |
|                 marker_bit | 1 | bslbf |
|             } | | |
|             for(i=0;i<N;i++) { | | |
|                 reserved ~ L22040 | 8 | bslbf |
|             } | | |
|         } | | |
|         for(i=0;i<N; I++) { | | |
|             stuffing_byte | 8 | bslbf |
|         } | | |
|     } | | |
| } | | |

FIG. 23

| syntax | No. of bits | Mnemonic |
|---|---|---|
| XML_subtitle_assist_information ( ) { | | |
|     data_field_tag | 8 | uimsbf |
|     data_field_length | 8 | uimsbf |
|     If(data_field_length >0 ) { | | |
|         TargetFlag | 1 | bslbf |
|         Reserved | 7 | |
|         If(TargetFlag = 1){ | | |
|             NumOfTarget | 4 | uimsbf |
|             Reserved | 4 | |
|             for(i=0; i<NumOfTarget; i++){ | | |
|                 SubtiltleID | 4 | uimsbf |
|                 Reserved | 4 | |
|                 SubtitleInfo ( ) | | |
|             } | | |
|         } | | |
|         Else SubtitleInfo() | 4 | uimsbf |
|     } | | |
| } | | |

— L23010

```
GamutFlag
If(GamutFlag = 1){
        SubtitleGamut
}
PeakBrightnessFlag
if (PeakBrightnessFlag = 1){
        SubtitlePeakBrightness
} ...
```
— L23030

| data_field_tag | Description |
|---|---|
| 0x00 | Reserved |
| 0x01 | Announcement switching data field |
| 0x02 | AU_information data field |
| 0x03 | AVR_assist_information data field |
| 0x04 | DVB reserved |
| 0x05 | XML_subtitle_assist_information_data_field |
| 0x06-0x9F | reserved for future use |
| 0xA0 to 0xFF | user defined |

| syntax | No. bits | Mnemonic |
|---|---|---|
| SubtitleInfo () { | 4 | uimsbf |
| SubtilteType | 3 | uimsbf |
| SubtitleAspectRatio | 4 | uimsbf |
| If(AdditionalAspectRatioFlag) { | | |
| MinSubtitleAspectRatio | 4 | uimsbf |
| MaxSubtitleAspectRatio | 4 | uimsbf |
| } | | |
| SubtitlePeakBrightness | 16 | uimsbf |
| SubtitleBlackLevel | 16 | uimsbf |
| SubtitleContrastRatio | 16 | uimsbf |
| SubtitleEOTF | 4 | uimsbf |
| SubtitleBitDepth | 4 | uimsbf |
| GamutTypeFlag | | |
| If(GamutTypeFlag = 0) SubtitleGamut | 4 | uimsbf |
| Else { | | |
| SubtitlePrimaryRx | 10 | uimsbf |
| SubtitlePrimaryRy | 10 | uimsbf |
| SubtitlePrimaryGx | 10 | uimsbf |
| SubtitlePrimaryGy | 10 | uimsbf |
| SubtitlePrimaryBx | 10 | uimsbf |
| SubtitlePrimaryBy | 10 | uimsbf |
| SubtitlePrimaryWx | 10 | uimsbf |
| SubtitlePrimaryWy | 10 | uimsbf |
| } | | |
| } | | |

— L24010

```
DiffGamutFlag
If(DiffGamutFlag = 1){
        SubtitleGamut
}
DiffPeakBrightnessFlag
if (DiffPeakBrightnessFlag = 1){
        SubtitlePeakBrightness
} ...
```

| syntax | No. bits | Mnemonic |
|---|---|---|
| auxiliary_data_structure () { | | |
|   payload_format | 4 | uimsbf |
|   Reserved | 3 | uimsbf |
|   CRC_flag | 1 | uimsbf |
|   for (i=0; i<N; I++) { | | |
|     payload_byte | 8 | uimsbf |
|   } | | |
|   if ( CRC_flag == '1' ) { | | |
|     CRC_32 | 32 | uimsbf |
|   } | | |
| } | | |

L25010

| Value | Meaning |
|---|---|
| 0x0 | DVB reserved |
| 0x1 | The payload field shall consist of zero or more descriptors from those defined in claues 5 of the present document |
| 0x2-0x7 | DVB reserved |
| 0x8 | XML_subtitle_assist_information_data_field |
| 0x9 | 0xF reserved (0x9 may actually include an XML subtitle such as TML/SMPTE-TT/IMSC1/EBU-TT-D.) |

L25020

METHOD AND DEVICE FOR TRANSMITTING AND RECEIVING BROADCAST SIGNAL FOR BROADCAST SERVICE ON BASIS OF XML SUBTITLE

CROSS-REFERENCE TO RELATED APPLICATIONS

This application is a National Stage filing under 35 U.S.C. 371 of International Application No. PCT/KR2015/009112, filed on Aug. 31, 2015, which claims the benefit of U.S. Provisional Applications No. 62/143,173, filed on Apr 5, 2015, the contents of which are all hereby incorporated by reference herein in their entirety.

TECHNICAL FIELD

The present invention relates to transmission and reception of broadcast signals, and more particularly, to a method and/or device for transmitting and receiving a broadcast signal for a broadcast service based on XML subtitles.

BACKGROUND ART

With development of digital technology and communication technology, dissemination of and demand for multimedia content centered on audio/video in various fields including the Internet and personal media as well as broadcast and movie have rapidly increased. Further, consumer demand for realistic media for providing three-dimensional effects through broadcast and movie has increased. In addition, with development of display technology, TV screens used in households have been enlarged and thus consumption of high-quality content such as high definition (HD) content has increased. Along with 3DTVs, a realistic broadcast such as ultra high definition TV (UHDTV) has attracted attention as a next-generation broadcast service. In particular, a discussion about an ultra high definition (UHD) broadcast service has been increased.

A current broadcast subtitle service is being provided in the form of closed captioning or digital video broadcasting (DVB) subtitles. Since DVB subtitles are provided in the form of a bitmap image, subtitles having different sizes should be provided to images having various sizes or subtitles having a single size should be scaled. At this time, bandwidth efficiency may deteriorate in the former case and scaling sharpness may deteriorate in the latter case. In particular, recently, since HD broadcast services using UHDTVs have been actively discussed, necessity of a new broadcast subtitle service has emerged. In addition, a high-quality subtitle service having backward compatibility is also required according to phased change in image quality element of UHD.

DISCLOSURE

Technical Problem

An object of the present invention is to provide a method for transmitting a broadcast service based on XML subtitles.
Another object of the present invention is to provide a high-quality subtitle service.
Another object of the present invention is to provide signaling information for a high-quality subtitle service.
Another object of the present invention is to provide a method for transmitting signaling information for a high-quality subtitle service.

Technical Solution

In one aspect of the present invention, provided herein is a method for transmitting a broadcast signal, the method including encoding video data, subtitle data, and signaling information including metadata about the subtitle data, generating a broadcast signal containing the encoded video data, subtitle data, and signaling information, and/or transmitting the generated broadcast signal.

Preferably, the metadata may include information on an aspect ratio of a display targeted for production of the subtitle data, and maximum and minimum aspect ratio information on the display to which the subtitle data is applicable.

Preferably, the metadata may include maximum and minimum brightness information on the subtitle data, bit depth information on the subtitle data, EOTF (Electro-Optical Transfer Function) information applied to the subtitle data and/or color gamut information on the subtitle data.

Preferably, the metadata may be included in at least one of an adaptation field of an MPEG (Moving Picture Experts Group)-2 TS (Transport Stream), DVB (digital video broadcasting) auxiliary data and a header of a transport packet.

Preferably, the signaling information may include information for identifying that information contained in the adaptation field is the metadata about the subtitle data.

Preferably, the auxiliary data may include information for identifying that information included in the auxiliary data is the metadata about the subtitle data.

In another aspect of the present invention, provided herein is a method for receiving a broadcast signal, the method including receiving a broadcast signal containing video data, subtitle data, and signaling information including metadata about the subtitle data, parsing the video data, subtitle data and signaling information from the received broadcast signal, and/or decoding the parsed video data, subtitle data and signaling information.

Preferably, the metadata may include information on an aspect ratio of a display targeted for production of the subtitle data, and maximum and minimum aspect ratio information on the display to which the subtitle data is applicable.

Preferably, the metadata may include maximum and minimum brightness information on the subtitle data, bit depth information on the subtitle data, EOTF (Electro-Optical Transfer Function) information applied to the subtitle data and/or color gamut information on the subtitle data.

Preferably, the metadata may be included in at least one of an adaptation field of an MPEG (Moving Picture Experts Group)-2 TS (Transport Stream), DVB (digital video broadcasting) auxiliary data and a header of a transport packet.

Preferably, the signaling information includes information for identifying that information contained in the adaptation field is the metadata about the subtitle data.

Preferably, the auxiliary data may include information for identifying that information included in the auxiliary data is the metadata about the subtitle data.

The reception method may further include converting a size of a region in which the decoded subtitle data is output, using the information on the aspect ratio of the display targeted for production of the subtitle data and/or the maximum and minimum aspect ratio information on the display to which the subtitle data is applicable, and outputting the converted subtitle data and the decoded video data.

In another aspect of the present invention, provided herein is a device for transmitting a broadcast signal, the device including an encoder configured to encode video data, subtitle data, and signaling information including metadata about the subtitle data, a broadcast signal generator configured to generate a broadcast signal containing the encoded video data, subtitle data, and signaling information, and/or a transmitter configured to transmit the generated broadcast signal.

In another aspect of the present invention, provided herein is a device for receiving a broadcast signal, the device including a receiver configured to receive a broadcast signal containing video data, subtitle data, and signaling information including metadata about the subtitle data, a demultiplexer configured to parse the video data, the subtitle data, and the signaling information in the received broadcast signal, and/or a decoder configured to decode the parsed video data, subtitle data, and signaling information.

Advantageous Effects

According to the present invention, a method for transmitting a broadcast service based on XML subtitles may be provided.

Further, according to the present invention, a high-quality subtitle service may be provided.

Further, according to the present invention, signaling information for a high-quality subtitle service may be provided.

Further, according to the present invention, a method for transmitting signaling information for a high-quality subtitle service may be provided.

DESCRIPTION OF DRAWINGS

FIG. 5 is a diagram showing a method of transmitting metadata of subtitles according to an embodiment of the present invention.

FIG. 6 is a diagram showing a detailed description of elements of metadata of subtitles according to an embodiment of the present invention.

FIG. 7 is a diagram showing a detailed description of elements of metadata of subtitles according to an embodiment of the present invention.

FIG. 8 is a diagram showing an additional description of elements of metadata of subtitles according to an embodiment of the present invention.

FIG. 12 is a diagram showing metadata including information on subtitles according to an embodiment of the present invention.

FIG. 13 is a diagram showing metadata including information on subtitles according to another embodiment of the present invention.

FIG. 14 is a diagram showing a detailed description of elements of metadata of subtitles according to an embodiment of the present invention.

FIG. 15 is a diagram showing a detailed description of elements of metadata of subtitles according to an embodiment of the present invention.

FIG. 16 is a diagram showing a detailed description of elements of metadata of subtitles according to an embodiment of the present invention.

FIG. 17 is a diagram showing a method of expressing the color of subtitles according to an embodiment of the present invention.

FIG. 18 is a diagram showing a method of expressing the color of subtitles according to another embodiment of the present invention.

FIG. 19 is a diagram showing a method of expressing the color of subtitles according to another embodiment of the present invention.

FIG. 21 is a diagram showing configuration of a program map table (PMT), an adaptation field data descriptor, and an adaptation field data identifier according to an embodiment of the present invention.

FIG. 22 is a diagram showing configuration of an adaptation field according to an embodiment of the present invention.

FIG. 23 is a diagram showing configuration of XML subtitle assist information and a data_field_tag value included in XML subtitle assist information according to an embodiment of the present invention.

FIG. 24 is a diagram showing configuration of Subtitle-Info( ) according to an embodiment of the present invention.

FIG. 25 is a diagram showing configuration of auxiliary_data_structure( ) and a payload_format field according to an embodiment of the present invention.

BEST MODE

Figure 1:
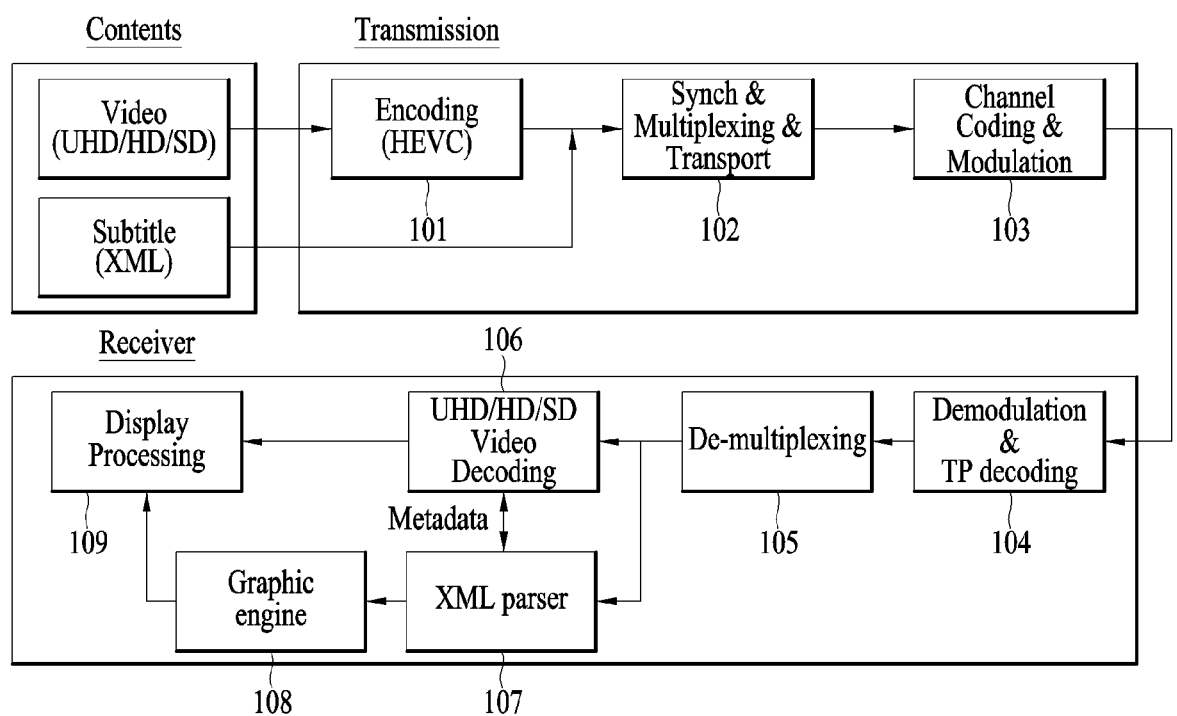
FIG. 1 is a diagram showing an XML based broadcast subtitle service according to an embodiment of the present invention.

Hereinafter, embodiments of the present invention will be described in detail with reference to the accompanying drawings and the disclosure in accompanying drawings, but the present invention is not limited to or by the embodiments.

Although the terms used in this specification are selected, as much as possible, from general terms that are widely used at present while taking into consideration the functions obtained in the present invention, these terms may be replaced by other terms by those skilled in the art, customs, emergence of new technologies, or the like. Also, in a particular case, terms that are arbitrarily selected by the applicant may be used. In this case, meanings of these terms may be disclosed in corresponding description parts of the invention. Accordingly, it should be noted that the terms used herein should be construed based on practical meanings thereof and the whole content of this specification, rather than being simply construed based on names of the terms.

As a broadcast service starts to be provided through Internet protocol (IP) as a next-generation broadcast service, a new subtitle service standard which will replace existing broadcast subtitles was established. A combination of an existing broadcast and an IP will be provided as a future broadcast service. At this time, when subtitles generated according to different standards are provided, efficiency may deteriorate.

The present invention describes a method of providing a subtitle service in old and new receivers based on high-quality image elements such as WCG, HDR and higher bit depth upon providing a digital image subtitle service using XML subtitles (TTML, SMPTE-TT, EBU-TT-D, etc.).

Recently, a standard of subtitles based on XML such as time text markup language (TTML) and EBU time text (EBU-TT) has been established. Although this standard aims at a subtitle service in a media and IP streaming environment, standard groups such as DVB and ATSC attempt to use this standard even in a broadcast service. To this end, it is possible to use a unified subtitle source in various broadcast environments and to adaptively use the same subtitle source in various service environments (e.g., HD, UHD, etc.).

XML based subtitles are being considered as a UHD based next-generation subtitle service method, since XML based subtitles are configured to support video having various sizes and are suitable for an IP streaming based service. Change from HD to UHD leads to resolution improvement and change in various image quality aspects such as dynamic range, color gamut, and bit depth. Therefore, in a next-generation subtitle service, such image elements need to be considered. However, current TTML based XML subtitles do not consider such elements and needs to consider elements such as WCG and HDR in order to cope with various service environments.

Hereinafter, a method of providing a suitable subtitle service even when a subtitle production environment and a display environment are different in terms of the image quality elements such as color gamut and luminance range in provision of an XML based broadcast media subtitle service will be described.

In the present invention, as a method of utilizing subtitles produced based on XML in a broadcast media service, XML subtitles metadata service method capable of delivering information on a production environment of XML subtitles in order to support receivers and displays having various capabilities in terms of HDR and WCG will be described.

In addition, the present invention proposes a method of expressing a maximum of 16 bits while continuously supporting an existing 8-bit system in a state in which the bitdepth of XML subtitles is restricted to 8 bits.

In addition, in the present invention, operation of a receiver related to color gamut, dynamic range and bit depth when a subtitle production environment and an image reproduction environment are different will be described.

For understanding of the present invention and convenience of description, terms and abbreviations will be defined as follows.

HEVC (High Efficiency Video Coding) is a high-efficiency video coding standard for providing the same video quality with a compression ratio which is about twice that of existing H.265/AVC technology.

XML (Extensible Markup Language) is a language produced by improving an HTML and can improve a homepage establishment function, a search function, etc. and easily process complex data of a client system. In the present invention, XML is used as a language configuring subtitle data and XML subtitles may include a head and a body.

A PTS (Presentation Time Stamp) may mean a value indicating a time when a decoded access unit is reproduced. In the present invention, the PTS may be used to synchronize a video ES with a subtitle ES.

An ES (Elementary Stream) may mean output of a data encoder. That is, outputs of a video encoder and an audio encoder may be defined as a video ES and an audio ES, respectively. In the present invention, XML subtitles ES may be defined and used.

A TS (Transport Stream) refers to a transport stream including one or several programs in an MPEG-2 system and may be used in a transport medium with transmission errors. In the present invention, the TS may mean a transport stream in which at least two of a video ES, an audio ES and a subtitle ES are multiplexed and transmitted.

FIG. 1 is a diagram showing an XML based broadcast subtitle service according to an embodiment of the present invention. FIG. 1 is a diagram showing an end-to-end system including a transmitter and a receiver for a digital broadcast service. The XML based subtitles used in the present invention is not influenced by the size of video and thus is applicable to UHD/HD/SD.

A transmitter may transmit compressed video and XML subtitles modified for transmission through a multiplexer. In addition, a receiver may demultiplex a received signal and then provide subtitles through image decoding and an XML parser. A graphics engine may modify a subtitle expression method according to the environment of the receiver and output the subtitles to a display processor. The display processor may output the decoded video and the subtitles.

In FIG. 1, the transmitter may receive video data and subtitle information. The resolution of video data input to the transmitter may be UHD, HD or SD. In addition, the subtitle information input to the transmitter may be described in XML. The video data input to the transmitter may be encoded by an encoder in the transmitter (101). The transmitter may use high efficiency video coding (HEVC) as a method of encoding video data. The transmitter may synchronize and multiplex the encoded video data and the XML subtitles using a multiplexer (102). Here, the XML subtitles may be modified for transmission. A method of modifying XML subtitles and a method of generating metadata of the XML subtitles will be described in detail below. The transmitter may perform channel coding and modulation with respect to the multiplexed synchronized data and transmit the data as a broadcast signal.

The receiver may receive the broadcast signal and perform demodulation and transport packet decoding. In addition, the receiver may demultiplex the decoded transport packet and perform video decoding and XML parsing. XML parsing may be performed through an XML parser. Here, the video decoder and the XML parser may exchange metadata. Such metadata may be used as supplementary information upon displaying the video and the subtitles. The receiver may demodulate the received broadcast signal and perform transport packet decoding (104). The decoded transport packet is input to a video decoder 106 and an XML parser 107 after passing through a demultiplexer 105. Here, the video decoder 106 may decode UHD, HD or SD video data according to the resolution of the received video data. In addition, the XML parser 107 may extract the XML subtitles. In this process, the receiver may consider image elements in display of the video data and the XML subtitles using the metadata. Here, the image element may include dynamic range, color gamut, bit depth, etc., for example. In particular, in the present invention, if a wide color gamut (WCG) and a high dynamic range (HDR) of UHD image quality elements are included in a service (e.g., DVB UHD-1 phase 2, BD UHD-FE, etc.), information on the image quality elements which are used as a subtitle production criterion may be provided to the receiver. To this end, if a subtitle production environment and a display environment are different, the receiver may appropriately modify the color or luminance of the subtitles according to the display environment. The graphics engine 108 may modify the expression method of the XML subtitles in correspondence with the above-described image elements. The decoded video data and the XML subtitles, the expression method of which is modified, may be processed and displayed by the display processor 109.

Figure 2:
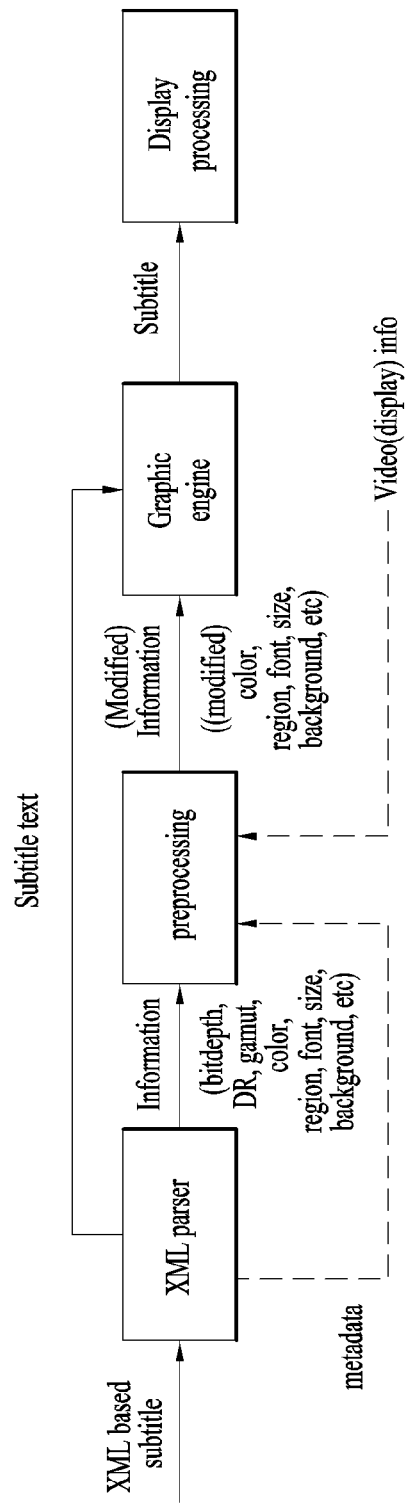
FIG. 2 is a diagram showing operation of a receiver related to XML based subtitles according to an embodiment of the present invention.

FIG. 2 is a diagram showing operation of a receiver related to XML based subtitles according to an embodiment of the present invention. The receiver may analyze content of the XML based subtitles through an XML parser. In addition, the receiver may deliver the content of the subtitles, information for expressing the subtitles and spatial information of the subtitles to a graphics engine. Here, the information for expressing the subtitles may include at least one of font, color and/or size information. In addition, the spatial information of the subtitles may include at least one of region and/or resolution information. The receiver of the present invention may perform a preprocessing procedure prior to delivery of the subtitles and information on the subtitles to the graphics engine. That is, a preprocessing procedure of detecting whether the subtitle production environment and the display environment of the receiver are different and transforming the subtitles may be performed. The receiver may deliver the subtitle information transformed through preprocessing to the graphics engine. The graphics engine may generate subtitles using the content of the subtitles or the information on the transformed subtitles and deliver the subtitles to a display processor.

Figure 3:
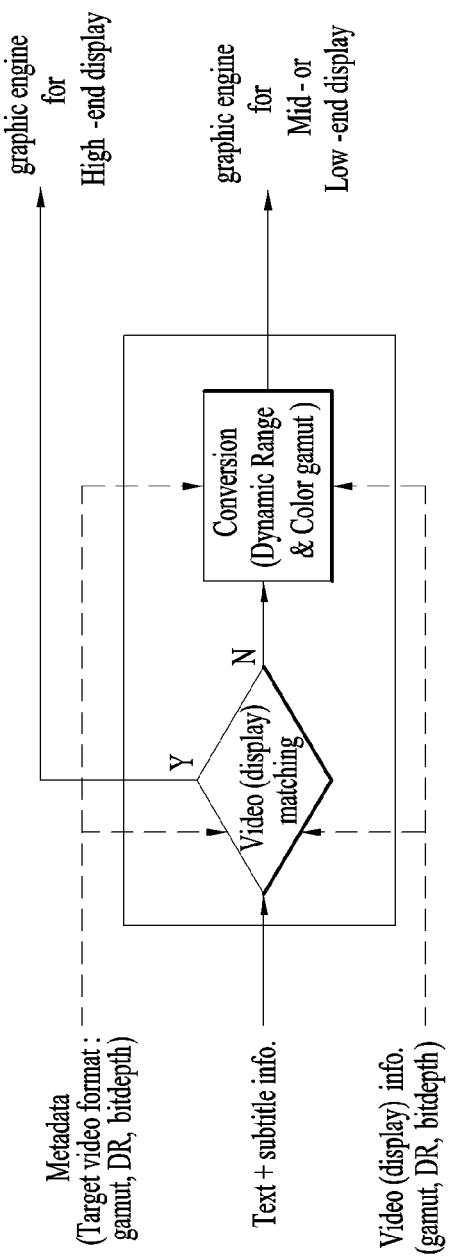
FIG. 3 is a diagram showing a preprocessing procedure of subtitles in a broadcast receiver according to an embodiment of the present invention.

FIG. 3 is a diagram showing a preprocessing procedure of subtitles in a broadcast receiver according to an embodiment of the present invention. The preprocessing procedure may include a step of detecting whether a subtitle production environment and a display environment match and a conversion step. The receiver may detect or determine whether the subtitle production environment and the display environment match based on metadata of a target video format of subtitles and metadata of a display of the receiver. The metadata of the target video format of the subtitles may include bitdepth, dynamic range and color gamut information. At this time, a determination criteria may be delivered through metadata in XML, and EBU-TT-D may be delivered to the receiver through ebuttm:RefGamut, ebuttm:RefDynamicRange, ebuttm:EOTF, ebuttm:RefBitDepth. Although the information is defined in the EBU-TT-D metadata in the above description, the same information may be defined in TTML metadata (ttm), parameter (ttp) and style (tts). That is, the elements newly defined in the present invention are applicable to XML based subtitle standards such as TTML, EBU-TT, SMPTE-TT, CFF-TT, Youview and EBU-TT. In the present invention, gamut, dynamic range and bitdepth are used as comparison criteria and resolution and aspect ratio may be used as comparison criteria if necessary. In addition, the metadata of the display of the receiver may include display environment information and may include the bitdepth, dynamic range and color gamut information of the display of the receiver.

In the matching step, if the metadata of the subtitle production environment and the metadata of the display environment match, subtitle text data and subtitle metadata are delivered to the graphics engine for high-end display. That is, if it is determined that the target video format of the subtitles matches the metadata of the display or is acceptable, the procedure progresses to a next step without processing. Here, determining that the target video format of the subtitles matches the metadata of the display or is acceptable may mean that video is HDR/WCG video or the display is an HDR/WCG display. The graphics engine may generate subtitles using the received subtitle text data and the metadata of the subtitles and deliver the generated subtitles to the display processor.

In contrast, if it is determined that the metadata of the subtitles does not match the display environment, that is, if the expression method of the subtitles needs to be converted, the preprocessing procedure may include a step of converting a subtitle expression method in terms of the color and luminance of the subtitles. In the conversion step, the subtitle expression method included in the metadata of the subtitles may be converted based on the metadata of the target video format of the subtitles and the metadata of the display of the receiver. That is, the bitdepth, dynamic range or color gamut included in the metadata of the subtitles may be converted and the modified bitdepth, modified dynamic range and modified color gamut may be delivered to the graphics engine. The transformed metadata and subtitle text may be delivered to a graphics engine for mid-end or low-end display. The graphics engine may generate subtitles based on the received subtitle text data and the transformed metadata of the subtitles and deliver the generated subtitles to the display processor. In the preprocessing procedure, each element is converted if the metadata of the subtitles and the metadata of the display differ in terms of color gamut, dynamic range or bitdepth. The conversion step is based on color gamut, dynamic range, EOTF and bitdepth information, which is reference information delivered through ebuttm:RefGamut, ebuttm:RefDynamicRange, ebuttm:EOTF and ebuttm:RefBitDepth newly defined in the metadata and (1) the difference may be ignored or (2) color gamut mapping or dynamic range mapping may be performed.

The graphics engine performs transformation for reproducing text information as video information and the receiver performs display processing with respect to the output of the graphics engine and combines the video, the subtitles and the other elements configuring the video to configure final display video.

Figure 4:
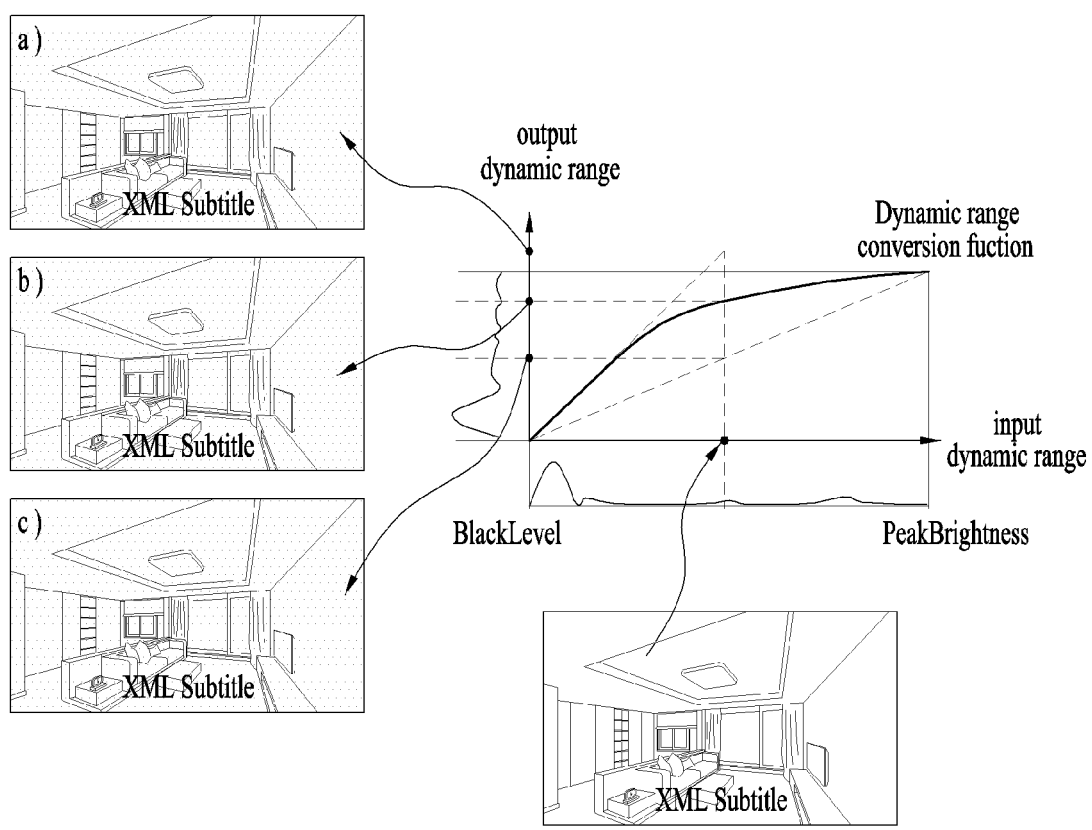
FIG. 4 is a diagram showing mapping of dynamic range to luminance according to an embodiment of the present invention.

FIG. 4 is a diagram showing mapping of a dynamic range to luminance according to an embodiment of the present invention. That is, mapping of a dynamic range to luminance of XML based subtitles is shown. More specifically, an example of a method of reproducing XML subtitles produced for HDR video in an SDR display environment is shown. If a luminance range used in the HDR video is broader than that supported by the display of the receiver, the luminance of video is changed through dynamic range mapping. At this time, if only the luminance of video is changed without considering the luminance range of the subtitles, the subtitles may not be suitable for change in luminance of the surrounding part: the luminance of the subtitles is excessively higher than that of the video as shown in a) or the luminance of the subtitles is excessively lower than that of the video as shown in c). In order to prevent this problem, the luminance value of the subtitles may be adjusted using a transformation function similar or equal to that used in video dynamic range mapping. Here, the receiver may use reference information of the luminance of the subtitles. In other words, through the method proposed by the present invention, the broadcast transmitter may insert dynamic range information of a target subtitles reproduction environment or a subtitle production environment in XML metadata. To this end, since the dynamic range information of the target subtitle reproduction environment or the subtitle production environment are included in XML metadata (ebuttm:RefDynamicRange), the receiver may perform comparison with the subtitle reproduction environment of the display, convert the subtitle expression method to luminance suitable for the environment of the receiver using suitable dynamic range mapping, and reproduce the subtitles.

In addition, the luminance range of the video and the luminance range of the subtitles may be different and, in this case, the luminance range of the subtitles needs to be converted to suit the luminance range of the video. The receiver may use ebuttm:RefDynamicRange which is reference information of the dynamic range as the reference information for determination and conversion.

If the color gamuts of the subtitle production environment and the receiver do not match, the color of the subtitles may be changed. Through a method similar to the above-described method, conversion into a color space suitable for the environment of the receiver may be performed. If the color space of the subtitle production environment or a target color space considered to reproduce the subtitles and the color space of the display do not match, the receiver may convert the color gamut of the subtitles to a displayable color gamut through the same procedure as color gamut mapping of the video. In addition, if necessary, the dynamic range mapping information or the color gamut mapping information may be delivered in the XML subtitles.

FIG. 5 is a diagram showing a method of transmitting metadata of subtitles according to an embodiment of the present invention. More specifically, an embodiment of XML subtitle metadata in EBU-TT-D is shown. The metadata of the subtitles may include information on at least one of color gamut, dynamic range, EOTF and bitdepth.

In the embodiment, reference information of the subtitles may be set and, for example, the color gamut may be set to BT.2020, the dynamic range may be set to 0.0001 nits to 2000 nits, and the bitdepth may be set to 12 bits.

More specifically, the XML subtitle metadata may include color gamut information of the subtitles. The XML subtitle metadata may include ebuttm:RefGamut="BT2020", which may mean that the color gamut of the subtitles is set to BT2020.

More specifically, the XML subtitle metadata may include dynamic range information of the subtitles. The XML subtitle metadata may include ebuttm:RefDynamicRange=2000 100 200000, which may mean that the dynamic range of the subtitles is set to minimum luminance of 0.01 and maximum luminance of 2000 nits. Here, 200000 may mean a ratio of the minimum luminance to the maximum luminance. A detailed description thereof will be given below.

More specifically, the XML subtitle metadata may include Electro-Optical Transfer Function (EOTF) information of the subtitles. The XML subtitle metadata may include ebuttm:EOTF="SMPTE2084", which may mean that the EOTF of the subtitles is set to SMPTE2084.

More specifically, the XML subtitle metadata may include bitdepth information of the subtitles. The XML subtitle metadata may include ebuttm:RefBitDepth=12, which may mean that the bitdepth of the subtitles is set to 12 bits. In addition, the XML subtitle metadata may include ebutts:colorExtent="0F040A" and ebutts:backgroundColorExtent="010803" to additionally set the extension field of the colors of the subtitles and the background. That is, the metadata may be set to the colors of the subtitles and the background to <tt:style xml:id="BaseStyle" tts:color="red", ebutts:colorExtent="0F040A" tts:backgroundColor="yellow" ebutts:backgroundColorExtent="010803" . . . . />. To this end, the color of the subtitles is red and the color of the background is yellow in the 8-bit based receiver, and the subtitles having the color of red=0x0FFF, green=0x0004 and blue=0x000A are represented in the 12-bit based receiver. In addition, the color of the background is yellow in the 8-bit based receiver and is red=0xoFF1, green=0x0FF8 and blue=0x003 in the 12-bit based receiver.

The metadata of the subtitles of the present invention is applicable to EBU-TT-D as described above and is also applicable to XML based subtitle standards such as TTML, SMPTE-TT, CFF-TT, Youview and EBU-TT using a similar method.

FIG. 6 is a diagram showing a detailed description of elements of metadata of subtitles according to an embodiment of the present invention. (a) shows a color gamut field. ebuttm:RefGamut included in the metadata indicates the color gamut field considered upon producing the subtitles and may be specified to an existing color gamut such as BT.709 or BT.2020 as shown in the figure. In addition, ebuttm:RefGamut may provide information on an arbitrary color gamut by directly specifying CIExy coordinates. In the case of the arbitrary color gamut, CIExy coordinates (xRed, yRed, xGreen, yGreen, xBlue, yBlue, xWhite, yWhite) of red, green, blue and white points may be delivered. Here, a value corresponding to 10000 times an original coordinate value is delivered according to value=originalValue*10000. If an existing color gamut is used, BT709 or BT2020 attributes may be predefined and used and, as shown in the figure, it is indicated that the color gamut is BT2020 using the <namedGamut> attribute. The color gamut field may be used as information for determining whether the color gamuts of the subtitle production environment and the display environment (or video) match and, if necessary, information for color gamut mapping.

(b) shows a dynamic range field. The dynamic range field is an element indicating the dynamic range of the video considered upon producing the subtitles. The dynamic range field may include PeakBrightness, BlackLevel and ContrastRatio respectively indicating maximum luminance, minimum luminance and contrast ratio of the dynamic range. At this time, the ContrastRatio may indicate a ratio of maximum luminance to minimum luminance and may have a value of 10,000 in the case of 10,000:1, for example. The PeakBrightness and the BlackLevel are expressed in nits (cd/m^2), and BlackLevel may have a value corresponding to BlackLevel=OriginalValue*10000 in consideration of BlackLevel of 1 or less.

If there is a standardized dynamic range such as HD, for example, an SMPTE reference HDTV standard may be utilized using a <namedDynamicRange> attribute as shown in the figure. If a future HDR standard is released, a standardized dynamic range may be defined and used in a namedDynamicRange. The dynamic range field may be used as information for determining whether the dynamic ranges of the subtitle production environment and the display environment (or video) match and, if necessary, information for dynamic range mapping.

The color gamut and the dynamic range may be used to provide information on the subtitle production environment or to provide the color gamut and dynamic range information of target video/display.

(c) shows an EOTF field. The EOTF field may deliver EOTF information used in association with the dynamic range. The EOTF field may deliver existing EOTF information such as BT.1886 or SMPTE 2084. Although SMPTE 2084 is used in the above-described embodiment, the EOTF element may be used to deliver an arbitrary EOTF. The EOTF field may be used for luminance linearization prior to dynamic range mapping.

FIG. 7 is a diagram showing a detailed description of elements of metadata of subtitles according to an embodiment of the present invention. (a) shows a bitdepth field. An UHD broadcast transmitter may transmit a service based on a bitdepth of 8 bits or more in order to provide improved image quality. For example, a 10-bit based service will be provided in DVB UHD-1 phase 1 and a service based on at least 10 bits may be provided in UHD-1 phase 2, to which image quality elements such as WCG and HDR are added. Even in next-generation storage media such as BD UHD-FE or SCSA, a bitdepth of 10 bits or more may be similarly considered. However, in the EBU-TT-D standard, the expression method is restricted to 8 bits. Accordingly, there is a need for a method of defining new bitdepth expression or a method of extending and expressing a bitdepth while maintaining an existing system. In the present invention, the method of extending and expressing the bitdepth while maintaining the existing system will be described.

As shown in (a), in the present invention, the metadata of the subtitles may represent a maximum bitdepth capable of being provided by the subtitle system through ebuttm: RefBitDepth. The bitdepth may indicate the number of bits of the information expressing the color. The range of the bitdepth may be from 8 to 16. For example, the bitdepth may be set to 8, 10, 12 or 16. If a rich color such as logo is not expressed, simple subtitles are used and, if a pallet having a subtitle color is restricted to dithering, etc., a bitdepth of 8 or less may be used. That is, using this element, information on the pallet used in the subtitles may be delivered.

This field may be used as a criterion for comparing the bitdepth of the subtitles and the bitdepth of the receiver or video in the preprocessing procedure. In addition, this field may be used to inform the receiver that a bitdepth of 8 bits or more is used or for the receiver to detect that a bitdepth of 8 bits or more is used. If ebuttm:RefBitDepth is used and has a value of 9 or more, the color may be expressed using tts:color and ebuttds:colorExtent.

If it is necessary to support a high bitdepth for UHD with respect to an EBU-TT-D based subtitle service, that is, if ebuttm:RefBitDepth is set to a value of 9 or more in the present invention, an existing color expression method needs to be extended. In EBU-TT-D, the color is defined using tts:color and, as shown in (b), the colors of red, green, and blue (and alpha) may be expressed using an 8-bit bitdepth through the color expression method defined in <ebuttdt:distributionColorType>. As a method of extending the existing 8-bit based color expression method, as shown in (c), a method of further defining an extension field may be used. That is, the higher 8 bits of the colors of red, green and blue (and alpha) representable by the bitdepth may be represented through tts:color and lower bits except for the higher 8 bits may be represented through ebuttds:colorExtent. To this end, a receiver implemented based on EBU-TT-D ver. 1, that is, a legacy receiver or a HD receiver or fewer, which does not require a bitdepth of 8 bits or more, 8-bit base color information may be interpreted through tts:color. In addition, in a UHD receiver, 8-bit base color information may be interpreted through tts:color and a high depth exceeding 8 bits may be interpreted through ebutts: colorExtent.

The extension field may be expressed using the existing expression method without change, and, at this time, the lower bits except for the higher 8 bits defined in ebuttm: RefBitDepth are expressed using 8 bits. An embodiment thereof was described above.

FIG. 8 is a diagram showing an additional description of elements of metadata of subtitles according to an embodiment of the present invention. In EBU-TT, SMPTE-TT and TTML, the color may be expressed using rgb (r-value, g-value, b-value) along with #rrggbb. (a) shows an example of metadata expression of the color of the subtitles in TTML and EBU-TT may define color expression using <ebuttdt: colorType> with respect to the same method.

In this case, in order to represent the extended bitdepth, like the above-described embodiment, a method of defining an extension field "tts:colorExtent" may be used. (b) and (c) are embodiments of defining tts:colorExtent in TTML. However, since the extension field does not have an independent meaning, <namedColor> may not be used. As described above, in the case of EBU-TT, the extension field may be defined by <ebuttdt:colorTypeExtension>. For example, in a 12-bit based receiver, when the subtitles having the color of red=0x0FFF, green=0x0004, blue=0x000A are expressed, higher 8 bits of 12 bits may be represented using the existing color expression method and the lower 4 bits may be represented using the extension field. That is, the higher 8 bits may be represented using tts:color and the lower 4 bits may be represented using tts:colorExtent.

In the metadata of the subtitles according to the embodiment of the present invention, the extension field may be added to extend the color gamut and express subtitles having various colors, while maintaining the existing color expression method.

Figure 9:
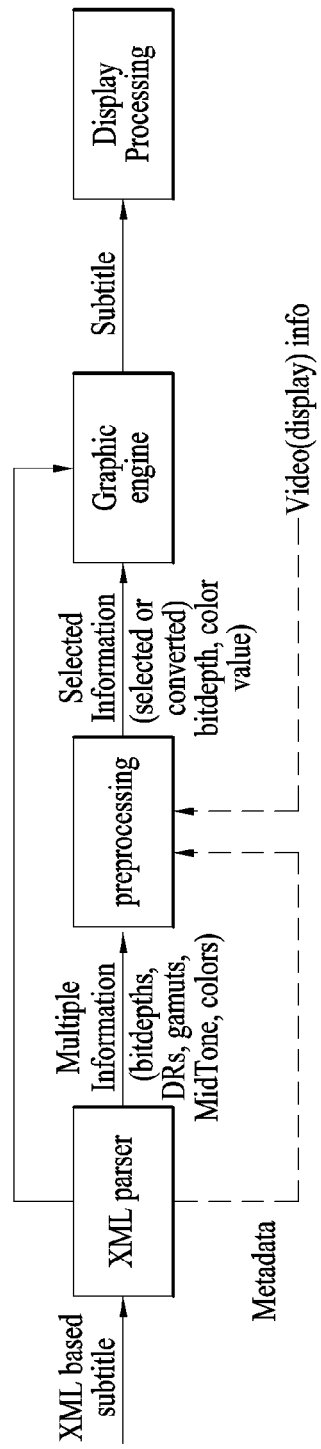
FIG. 9 is a diagram showing operation of a receiver related to XML based subtitles according to an embodiment of the present invention.

FIG. 9 is a diagram showing operation of a receiver related to XML based subtitles according to an embodiment of the present invention. In the present invention, the structure of a receiver capable of providing a subtitle service suitable for the environment of the receiver based on a single subtitle when services having different image qualities are provided to the same content like DVB UHD-1 phase 1 and phase 2 will be described. In addition, a receiver having a structure similar to that of the above-described receiver may be used even in an IP streaming based service for adaptively providing different image qualities according to transmission environments or a storage media based image service for providing different services according to environments of receivers. Examples of the IP streaming based service capable of adaptively providing different image qualities according to transmission environments include a MPEG-dynamic adaptive streaming over HTTP (DASH).

The receiver may analyze content of the XML based subtitles through an XML parser. In addition, the receiver may deliver the content of the subtitles and information for expressing the subtitles to a graphics engine. Here, the information for expressing the subtitles may include elements for identifying the image qualities of the content. That is, the information for expressing the subtitles may include at least one of bitdepth, dynamic range, color gamut, Mid-Tone and/or colors.

The receiver of the present invention may perform a preprocessing procedure prior to delivery of the subtitles and information on the subtitles to the graphics engine. The receiver may select the color, luminance or bitdepth information of the subtitles according to receivable service type or convert (transform) and use the above-described information based on the information of the subtitles.

The receiver may deliver the information on the subtitles selected or transformed through the preprocessing procedure to the graphics engine. The graphics engine may generate subtitles using the content of the subtitles or the information on the transformed subtitles and deliver the subtitles to a display processor.

Figure 10:
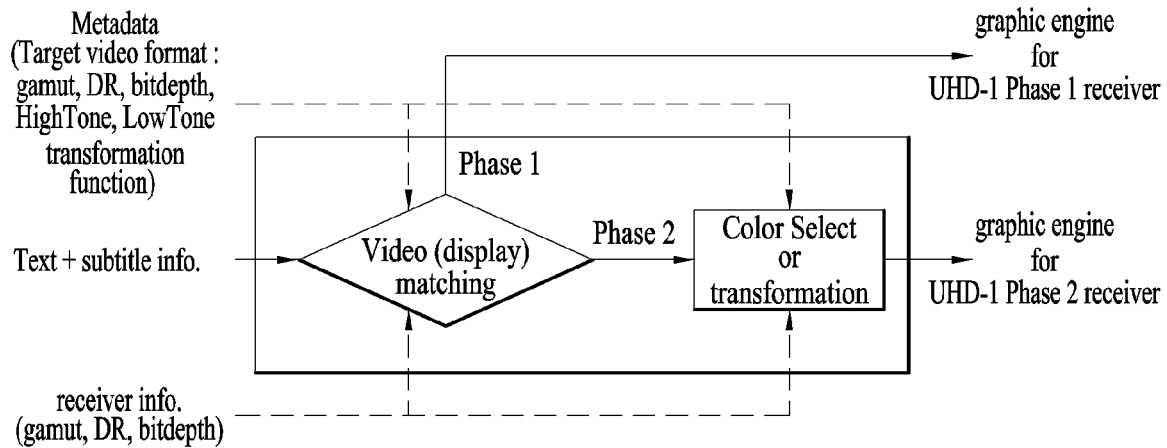
FIG. 10 is a diagram showing a preprocessing procedure of subtitles in a broadcast receiver according to an embodiment of the present invention.

FIG. 10 is a diagram showing a preprocessing procedure of subtitles in a broadcast receiver according to an embodiment of the present invention. The preprocessing procedure performed when received subtitles supports both DVB UHD-1 phases 1 and 2 is shown. The preprocessing procedure may include a step of detecting whether a subtitle production environment and a display environment match and a selection or transformation step. The receiver may detect or determine whether the subtitle production environment and the display environment match based on metadata of a target video format of subtitles and metadata of a display of the receiver. The metadata of the target video format of the subtitles may include bitdepth, dynamic range, color gamut, HighTone or LowTone as subtitles luminance reference value and transformation function information. At this time, a determination criteria may be delivered through metadata in XML, and, in the case of EBU-TT-D, the base image quality elements of the subtitles may be delivered to the receiver through ebuttm:Gamut, ebuttm:DynamicRange, ebuttm:EOTF, and ebuttm:BitDepth. The supplementarily supported image quality elements of the subtitles may be delivered to the receiver through ebuttm:SupplementaryGamut, ebuttm:SupplementaryDynamicRange, ebuttm:SupplementaryEOTF, and ebuttm:SupplementaryBitDepth. Alternatively, the base image quality elements or supplementarily supported image quality elements of the subtitles may be delivered together through ebuttm:Gamuts, ebuttm:DynamicRanges, ebuttm:EOTFs, and ebuttm:BitDepths. Although the information is defined in the EBU-TT-D metadata in the above description, the same information may be defined in TTML metadata (ttm), parameter (ttp) and style (tts). That is, the elements newly defined in the present invention are applicable to XML based subtitle standards such as TTML, EBU-TT, SMPTE-TT, CFF-TT, Youview and EBU-TT. In the present invention, gamut, dynamic range and bitdepth are used as comparison criteria and resolution and aspect ratio may be used as comparison criteria if necessary. In addition, the metadata of the display of the receiver may include display environment information and may include the bitdepth, dynamic range and color gamut information of the display of the receiver.

In the matching step, if the metadata of the subtitle production environment and the metadata of the display environment match, the text data and metadata of the subtitles are delivered to the graphics engine for a UHD-1 Phase 1 receiver. That is, if it is determined that the target video format of the subtitles received by the UHD-1 Phase 1 receiver matches the metadata of the display, the procedure progresses to a next step without separate processing. The graphics engine may generate subtitles using the received text data and metadata of the subtitles and deliver the generated subtitles to the display processor.

In contrast, if it is determined that the metadata of the subtitles does not match the display environment, that is, if the expression method of the subtitles needs to be selected or transformed, the preprocessing procedure may include a step of selecting a different subtitle expression method in terms of the color and luminance of the subtitles or transforming a subtitle expression method. In the selection or transformation step, the subtitle expression method included in the metadata of the subtitles may be selected or transformed based on the metadata of the target video format of the subtitles and the metadata of the display of the receiver. The selection step may be performed if the metadata of the subtitles includes a plurality of subtitle expression methods. That is, the receiver may select any one of a plurality of expression methods including bitdepth, dynamic range or color gamut included in the metadata of the subtitles to suit the metadata of the receiver. That is, the bitdepth, dynamic range or color gamut included in the metadata of the subtitles may be selected or transformed and the selected bitdepth, selected dynamic range and selected color gamut may be delivered to the graphics engine or the transformed bitdepth, transformed dynamic range and transformed color gamut may be delivered to the graphics engine. The transformed or selected metadata and subtitle text may be delivered to a graphics engine for a UHD-1 Phase 2 receiver. The graphics engine may generate subtitles based on the received subtitle text data and the selected or transformed metadata of the subtitles and deliver the generated subtitles to the display processor. In the preprocessing procedure, each element is selected or transformed if the metadata of the subtitles and the metadata of the display differ in terms of color gamut, dynamic range or bitdepth.

The graphics engine performs transformation for reproducing text information as video information and the receiver performs display processing with respect to the output of the graphics engine and combines the video, the subtitles and the other elements configuring the video to configure final display video.

The capabilities supported by the subtitles delivered by the present invention are compared with the capabilities of the receiver and then appropriate values of the color gamut, dynamic range and bitdepth are selected and used according to suitable format. At this time, comparison and selection may be performed based on the base color gamut, dynamic range, EOTF and bitdepth information delivered through ebuttm:Gamut, ebuttm:DynamicRange, ebuttm:EOTF and ebuttm:BitDepth and the supplementary color gamut, dynamic range, EOTF and bitdepth delivered through ebuttm:SupplementaryGamut, ebuttm:SupplementaryDynamicRange, ebuttm: SupplementaryEOTF and ebuttm:SupplementaryBitDepth. In addition, as another embodiment, comparison and selection may be performed based on the color gamut, dynamic range, EOTF and bitdepth information delivered through ebuttm:Gamuts, ebuttm:DynamicRanges, ebuttm:EOTFs and ebuttm:BitDepths including the base information and the supplementary information. The receiver may perform color gamut transformation or dynamic range transformation (1) if a difference between expression information is ignored, (2) if a value suitable for a given format is selected based on information in metadata or (3) if a transformation function for expression information is given. Hereinafter, a method of selecting expression information in the case of (2) will be described and a method of transforming expression information and, more particularly, dynamic range in the case of (3) will be described.

Figure 11:
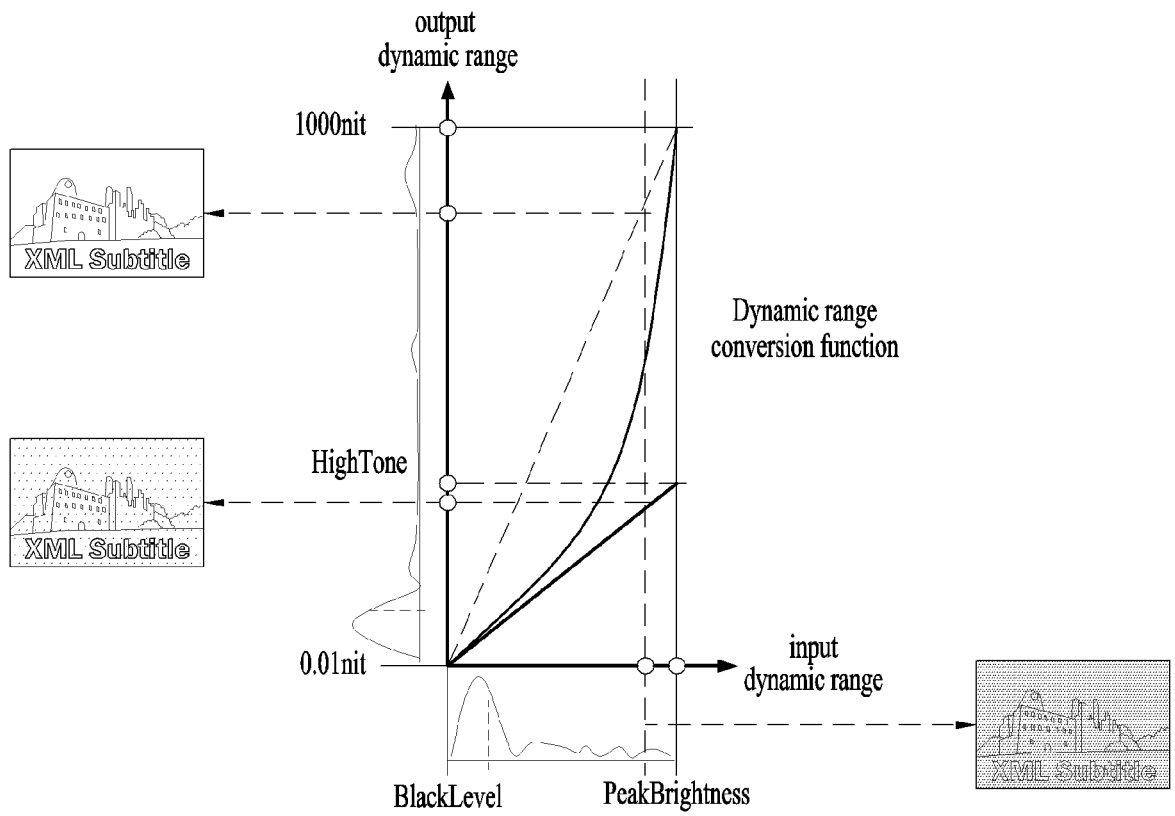
FIG. 11 is a diagram showing mapping of dynamic range to luminance according to an embodiment of the present invention.

FIG. 11 is a diagram showing mapping of a dynamic range to luminance according to an embodiment of the present invention. That is, mapping of a dynamic range to luminance of XML based subtitles is shown. That is, XML subtitles produced for SDR video is reproduced on an HDR display of a receiver. In this case, the luminance of the video is changed through dynamic range mapping. At this time, if the luminance of the subtitles is changed equally to the video without considering the luminance range of the video, the subtitles may be brighter than necessary. For example, the maximum luminance of the HDR video may be set to a very high value in order to express dazzling effects like highlighting. If the luminance of subtitles set to a maximum value in the SDR video is equally set to a maximum value even in the HDR video, the subtitles may be brighter than necessary.

In order to prevent this problem, appropriate subtitle luminance in a target image luminance range may be set and delivered upon encoding or a subtitle luminance reference value (HighTone and LowTone) may be delivered in metadata and subtitle luminance transformation for the HDR video may be performed within the reference luminance. For example, HighTone may be understood as appropriate maximum luminance in the given luminance range. Upon dynamic range transformation, luminance may not be changed based on the peak brightness of the dynamic range of the video or the peak brightness of the dynamic range supported by a target receiver, but the dynamic range of the subtitles may be changed based on HighTone. That is, a threshold of the luminance of the subtitles may be set. Similarly, LowTone may be appropriate minimum luminance in the given luminance range. At this time, HighTone and LowTone may be given in nits and the receiver may perform dynamic range mapping of the subtitles based on given information, independently of the luminance of the video. At this time, since the luminance range of the HDR video and the luminance range of the subtitles are different, the luminance range of the video needs to be expressed as a digital value upon transformation of the luminance/color of the subtitles.

FIG. 12 is a diagram showing metadata including information on subtitles according to another embodiment of the present invention. That is, an embodiment of subtitle metadata proposed by the present invention is represented with respect to EBU-TT-D. More specifically, the shown metadata has color gamut of BT.709, minimum luminance of 0.05 nits, maximum luminance of 100 nits and Bitdepth of 8 bits, for UHD phase 1, and has color gamut of BT.2020, minimum luminance of 0.01 nits, maximum luminance of 2000 nits and Bitdepth of 12 bits, for phase 2.

The metadata of the subtitles may include color gamut, dynamic range, EOTF, and bitdepth information. The metadata of the subtitles may support a phased access method of image quality like UHD phases 1 & 2. The metadata of the subtitles may include base color gamut, base dynamic range, base EOTF and base bitdepth information as a method of indicating the support ranges of UHD phase 1 and phase 2. For example, the metadata of the subtitles may include ebuttm:Gamut="BT709", ebuttm:DynamicRange=100 500 2000, ebuttm:EOTF="BT1886", and ebuttm:BitDepth=8 as base information. The meanings of the information were described above.

In addition, the metadata of the subtitles may include supplementary color gamut, supplementary dynamic range, supplementary EOTF and supplementary bitdepth information as supplementary information indicating information supported in the case of highest image quality through a scalable approach. For example, the metadata of the subtitles may include ebuttm:SupplementaryGamut="BT2020", ebuttm:SupplementaryDynamicRange=2000 100 200000 500 100, ebuttm:SupplementaryEOTF="SMPTE2084" and ebuttm:SupplementaryBitDepth=12 as supplementary information. This may indicate that the maximum luminance of target video is 2,000 nits, minimum luminance thereof is 0.01 nits, contrast ratio thereof is 200,000:1, appropriate subtitle maximum luminance thereof is 500 nits and minimum luminance thereof is 0.01 nits.

In addition, for the color of the subtitles, tts:color="rrggbb" may be included as base information and tts:colorSupplementary="#RRRGGGBBB" may be included as supplementary information. In addition, tts:backgroundColor="er'g'g'b'b'" may be included as base information of the background color of the subtitles and tts:backgroundColorSupplementary="#-R'R'R'G'G'G-'B'B'B'" may be included as supplementary information of the background color of the subtitles. The metadata in which the base information and the supplementary information of the subtitle expression method are defined through different fields may be delivered to the receiver.

FIG. 13 is a diagram showing metadata including information on a subtitle according to another embodiment of the present invention. That is, an embodiment of subtitle metadata proposed by the present invention is represented with respect to EBU-TT-D. More specifically, the shown metadata has color gamut of BT.709, minimum luminance of 0.05 nits, maximum luminance of 100 nits and Bitdepth of 8 bits, for UHD phase 1, and has color gamut of BT.2020, minimum luminance of 0.01 nits, maximum luminance of 2000 nits and Bitdepth of 12 bits, for phase 2.

The metadata of the subtitle may include color gamut, dynamic range, EOTF and bitdepth information. The metadata of the subtitle may support a phased access method of image quality like UHD phases 1 & 2. The metadata of the subtitle may include color gamut, dynamic range, EOTF and bitdepth information having a plurality of attributes as a method of indicating the support ranges of UHD phase 1 and phase 2. For example, the metadata of the subtitle may include information such as ebuttm:Gamuts="BT709" "BT2020", ebuttm:DynamicRanges=100 500 2000 2000 100 200000 500 100, ebuttm:EOTFs="BT1886" "SMPTE2084", ebuttm:BitDepths=8 10 12, ebuttm:ColorTransformation="video" "function" "linear" 500 as expression information. Here, ebuttm:ColorTransformation may represent an example in which the metadata provides a color transformation method. As described above, each information may have two values supporting phases and the meanings of the information were described above. Such metadata in which a subtitle expression method is defined using information fields having a plurality of attributes in order to support UHD phase 1 and phase 2 may be delivered to the receiver. Such a metadata generation method is applicable to XML based subtitle standards such as TTML, SMPTE-TT, CFF-TT, Youview and EBU-TT.

FIG. 14 is a diagram showing a detailed description of elements of metadata of subtitles according to an embodiment of the present invention. (a) and (b) show color gamut fields. The metadata of the subtitles may respectively indicate the base color gamut and supplementarily supportable color gamut of the subtitles in ebuttm:Gamut and ebuttm:SupplementaryGamut elements as shown in (a). The attributes of the elements may provide information on an arbitrary color gamut by specifying a well-known color gamut such as BT.709 or BT.2020 or directly specifying CIExy coordinates. In the case of the arbitrary color gamut, the metadata of the subtitles may deliver CIExy coordinates (xRed, yRed, xGreen, yGreen, xBlue, yBlue, xWhite and yWhite) of red, green, blue and white points as shown in the figure. At this time, a value corresponding to 10000 times an original coordinate value is delivered according to value=originalValue*10000. If an existing color gamut is used, the metadata of the subtitles may use predefined BT709 or BT2020 attributes as shown in the figure. In the embodiment, in addition to BT. 709, supplementarily supportable BT.2020 is expressed using <namedGamut> attribute. This field may be used as information for determining whether the color gamuts of the subtitle production environment and the display environment (or image) match, information for determining a service supported by the subtitles and, if necessary, information for color gamut mapping.

The metadata of the subtitles may indicate a reference color gamut which is one type of expression information of the subtitles and a supplementarily supportable color gamut in one element as shown in (b). Here, the reference attribute will be described first and then the supplementarily supportable attribute will be described.

FIG. 15 is a diagram showing a detailed description of elements of metadata of subtitles according to an embodiment of the present invention. (a) and (b) show dynamic range. The metadata may use ebuttm:DynamicRange and ebuttm:AuxiliaryDynamicRange elements as shown in (a) in order to represent a base dynamic range and a supplementarily supported dynamic range considered in the subtitles. In the attributes of the elements, maximum luminance, minimum luminance and contrast ratio of the dynamic range may be represented by PeakBrightness, BlackLevel and ContrastRatio. In addition, the metadata may include HighTone and LowTone attributes indicating the maximum luminance and minimum luminance suitable for the subtitles, which are criteria for processing the dynamic range independent of video. At this time, ContrastRatio may indicate a ratio of maximum luminance to minimum luminance and may deliver a value of 10,000 in the case of 10,000:1, for example. The remaining values may deliver a value corresponding to BlackLevel=OriginalValue*10000 in nits (cd/m^2) in consideration of BlackLevel (and LowTone) of 1 or less.

If there is a standardized dynamic range like HD, for example, an SMPTE reference HDTV standard may be specified and used as a namedDynamicRange value as follows. A future HDR standard may be defined and then used in a namedDynamicRange. This field may be used as information for determining whether the dynamic ranges of the subtitle production environment and the display environment (or video) match and, if necessary, information for dynamic range mapping.

As another embodiment, as shown in (b), a reference dynamic range and a supplementarily supportable dynamic range may be indicated in one element. That is, ebuttm:DynamicRanges includes attributes such as PeakBrightness, BlackLevel, ContrastRatio, PeakBrightness2, BlackLevel2, ContrastRatio2, HighTone, and LowTone. Even in this embodiment, the independent dynamic range of the subtitles may be supplementarily described using HighTone and LowTone. Although an example of delivering HighTone and LowTone in ebuttm:ColorTransformation has been described in the above embodiment, information on HighTone and LowTone may be defined in the metadata as separate elements or may be defined in parts related to the dynamic range, e.g., ebuttm:DynamicRanges, ebuttm:SupplementaryDynamicRange, etc. Even in the embodiment of (b), as described above, PeakBrightness, BlackLevel and ContrastRatio may use values defined in the namedDynamicRange. In addition, PeakBrightness2, BlackLevel2 and ContrastRatio2 may also be defined and used in the namedDynamicRange.

FIG. 16 is a diagram showing a detailed description of elements of metadata of subtitles according to an embodiment of the present invention. (a) shows an EOTF field and (b) shows a BitDepth field.

The metadata may deliver information on a supplementary EOTF through ebuttm:SupplementaryEOTF along with ebuttm:EOTF which is information on a base EOTF if a used EOTF varies according to dynamic range. Alternatively, information on two EOTFs may be combined and delivered in one element through Ebuttm:EOTFs, and, in this case, a preceding element is a base element. In either case, like BT.1886 or SMPTE 2084, existing EOTF information may be defined and used in a namedEOTF. This field may be used for luminance linearization prior to dynamic range mapping.

The metadata may represent bitdepths through ebuttm:BitDepth and ebuttm:SupplementaryBitDepth if different bitdepths are supported according to broadcast service. Like a previous example, a base information element and a supplementary information element may be used or supported bitdepths may be simultaneously represented using Ebuttm:BitDepths. In this case, a base element precedes the supplementary information. This field may be used as a criterion for comparing the bitdepth of the subtitles and the bitdepth of the receiver or video or may be used to indicate or detect that a bitdepth of 8 bits or more is used in the received subtitles. If ebuttm:RefBitDepth is used and has a value of 9 or more, the metadata may express a color using a newly defined color expression method.

As described above, when the metadata of the subtitles delivered through the present invention is used, the receiver may compare the video elements supported by the subtitles and the video element supported by the receiver through ebuttm:Gamut, ebuttm:DynamicRange, ebuttm:EOTF and ebuttm:BitDepth as base information of image property metadata, ebuttm:SupplementaryGamut, ebuttm:SupplementaryDynamicRange, ebuttm:SupplementaryEOTF, ebuttm:SupplementaryBitDepth as supplementary information, and ebuttm:Gamuts, ebuttm:DynamicRanges, ebuttm:EOTFs and ebuttm:BitDepths including both base and supplementary information. In addition, it is determined that the receiver uses supplementarily supported elements, appropriates values of the color gamut, the dynamic range and the bitdepth may be selected and used according to a suitable format.

In addition, the receiver may represent image properties supported by the subtitles based on the information included in the metadata and represent actual color expression values with respect to a plurality of properties. Here, the luminance and bit depth may be included in color expression. Since it is assumed that the XML subtitles described in the present invention are backward compatible, there is a need for a method of expressing information on the subtitles using a method which may be processed in both an old receiver and a new receiver. Hereinafter, the method of expressing the color of the subtitles will be described.

FIG. 17 is a diagram showing a method of expressing the color of subtitles according to an embodiment of the present invention. (a) shows a method of expressing the color of the subtitles using a named color value. Although, in the XML subtitles, the color is basically expressed in hexadecimal, well-known colors may be expressed by the names of the colors. For example, red is 8-bit RGB and may be expressed by #FF0000 or "red". At this time, if a specific color has different digital values in different color gamuts, different colors may be expressed with respect to one digital value. However, if the name of the color is expressed, the same color may be expressed even in different color gamuts. For example, as shown in the figure, if a named color "red" is expressed, a receiver using BT. 709 may interpret the named color as a value of #FF0000 and a receiver using BT.2020 may interpret the named color as a value of #C80000. Such mapping of the named color may be predefined in the standard.

(b) shows a case of delivering a matching color value. The receiver may directly deliver color values expressing supplementary image properties supported by the XML subtitles. That is, like tts:color, in the existing EBU-TT-D, etc. the color expression method may be used without change and the color values of the supplementarily supported color gamut, dynamic range and bit depth may be delivered through tts:colorSupplementary. At this time, an existing receiver interprets only interpretable tts:color and a receiver capable of interpreting and supporting a supplementary color gamut (and bitdepth) uses colors expressed in tts:colorSupplementary. At this time, a high bit depth may be used in the case of the supplementrarily supported color gamut, dynamic range, etc. For example, if a color expression method of 12 bits or 16 bits is used, as shown in the figure, <ebuttdt:distributionColorTypeExtension12> or <ebuttdt:distributionColorTypeExtension16> may be defined.

FIG. 18 is a diagram showing a method of expressing the color of subtitles according to another embodiment of the present invention. Although the metadata of the subtitles directly delivers values corresponding to supplementarily supported elements in the above-described embodiment, a difference from a base value may be delivered through supplementary information. That is, as the concept of delivering diff satisfying "☐Supplementary color=base color+diff", in order to represent the sign and size of the difference value, a color different type may be defined as shown in the figure. That is, in order to deliver a difference between tts:colorSupplementary and a supported color expression value, an example of the expression method using <ebuttdt:distributionColorDifferenceTypeExtension12> or <ebuttdt:distributionColorDifferenceTypeExtension16> may be indicated. The difference information may include the sign and size of the difference value and the receiver may add or subtract the difference information to or from the base information, thereby acquiring information on the extended colors.

FIG. 19 is a diagram showing a method of expressing the color of subtitles according to another embodiment of the present invention. The metadata may directly deliver values corresponding to supplementarily supported services as in the above-described embodiment or provide information on the method of transforming the base color to directly deliver colors. In the present invention, this method may be referred to as a transformation method or a conversion method. The conversion method may implement the color of the subtitles to suit the receiver based on the color gamut, dynamic range and bitdepth of the target service of the metadata and HighTone and LowTone which are the luminance range of the subtitles. Alternatively, if video provides a scalable approach and the base and target of video and the base and target provided by the subtitles match, the conversion method of video may be used. The present invention may describe a method of providing a subtitle service having constant quality at receivers if the types of video and the considered service are different or if conversion capabilities of video and receiver are different. In the present invention, ebuttm:ColorTransformation may be used.

As an embodiment of ebuttm:ColorTransformation, the following may be considered. The metadata of the subtitles may deliver information related to color gamut scalability and information related to dynamic range scalability as color transformation. As a method of supporting this, (1) a method of using a transformation function of video, (2) a method of enabling a receiver to autonomously perform transformation through HighTone and LowTone information without a separate transformation function, (3) a method of delivering an LUT and (4) a method of delivering a transformation function may be used. In Method (1), "video" may be expressed in ebuttm:ColorTransformation and, if transformation of video is borrowed, supplementary information specially delivered in the metadata may not be necessary. In Method (2), "tone" may be expressed in ebuttm:ColorTransformation and luminance transformation preferred by the receiver may be used through appropriate subtitle luminance (HighTone, LowTone) delivered through the metadata. At this time, linear mapping may be the default. In Method (3), "LUT" may be expressed in ebuttm:ColorTransformation and a value corresponding to input/output of mapping may be delivered. In Method (4), "function" may be expressed in ebuttm:ColorTransformation, a separate transformation function may be used and the metadata may include the type of the function and coefficients. In the case of the LUT for color gamut transformation, ebuttm:ColorTransformation may deliver a value for RGB-to-RGB transformation and, if a separate transformation function is given, the coefficients of a transformation matrix may be delivered. Dynamic range transformation is considered based on change in Y value, a given transformation function may be divided into linear, exponential, piecewise linear, log and s-curve functions, and the metadata may deliver coefficients necessary for each function. At this time, an appropriate luminance range for subtitle transformation is necessary and HighTone and LowTone may be delivered in ebuttm:ColorTransformation. In addition, HighTone and LowTone may be defined in the metadata as separate elements or in parts related to the dynamic range, that is, ebuttm:DynamicRanges and ebuttm:SupplementaryDynamicRange.

Although color gamut scaling and dynamic range scaling information are separately delivered in this embodiment, transformation from BT.709+SDR to BT.709+HDR, BT.2020+SDR or BT.2020+HDR may be combined and delivered as one function.

Figure 20:
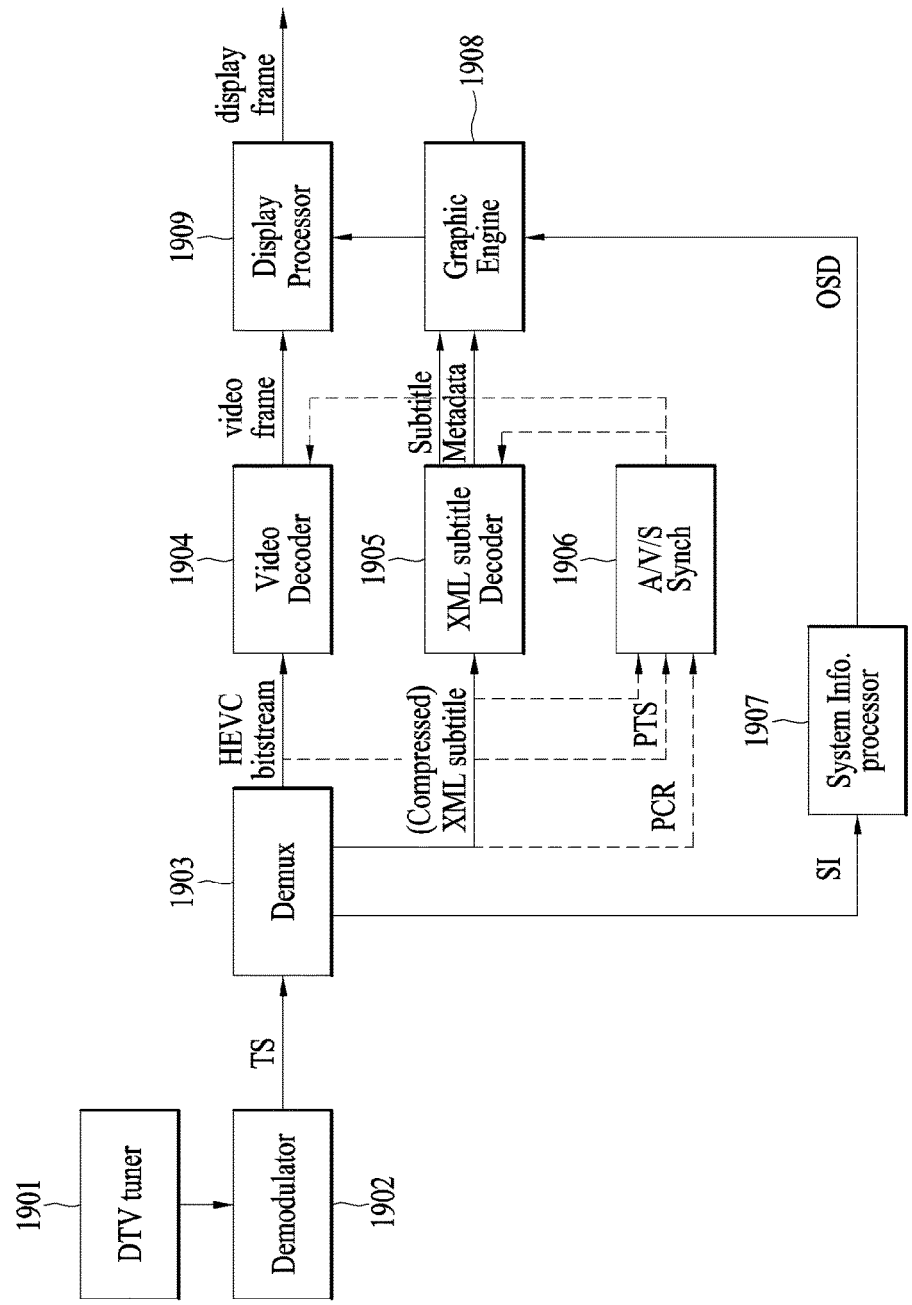
FIG. 20 is a diagram showing detailed configuration of a broadcast receiver according to an embodiment of the present invention.

FIG. 20 is a diagram showing the configuration of a broadcast receiver according to an embodiment of the present invention in detail. The broadcast receiver may include a reception unit 1901, a demodulator 1902, a demultiplexer

1903, a video decoder 1904, an XML subtitle decoder 1905, an audio/video/subtitle (A/V/S) synchronizer 1906, a system information (SI) processor 1907, a graphics engine 1908 and/or a display processor 1909.

The reception unit 1901 may receive a broadcast signal transmitted by the transmitter. The received broadcast signal may be input to the demodulator 1902.

The demodulator 1902 may demodulate the broadcast signal and output a transport stream (TS). The TS may be input to the demultiplexer 1903 to be demultiplexed. The demultiplexed TS may include an HEVC bitstream, XML subtitles and system information (SI). Here, the XML subtitles may include metadata.

The video decoder 1904 may receive and decode the HEVC bitstream and output a video frame.

The XML subtitle decoder 1905 may receive the XML subtitles and extract subtitles. The XML subtitle decoder 1905 may parse the metadata included in the XML subtitles and compare the parsed metadata with the metadata of the video or the display environment. Here, the metadata to be compared may include a dynamic range, a color gamut, a bit depth, etc. The XML subtitle decoder 1905 may convert the metadata of the subtitles depending on whether the compared metadata matches. The XML subtitle decoder 1905 may deliver, to the graphics engine, the metadata of the subtitles and the subtitles without separate transformation if the compared subtitle data matches. In contrast, if the compared subtitle data does not match, the XML subtitle decoder 1905 may convert the metadata of the subtitles and deliver the subtitle data and the converted metadata to the graphics engine. To this end, matching between the subtitles and the video can be enhanced.

As another embodiment, may select or transform the metadata of the subtitles depending on whether the compared metadata matches. The XML subtitle decoder 1905 may deliver, to the graphics engine, the base information and subtitles included in the metadata of the subtitles without separate transformation if the compared subtitle data matches or if a DVB UHD phase-1 receiver is supported. In contrast, if the compared subtitle data does not match or if a DVB UHD phase-2 receiver is supported, the XML subtitle decoder 1905 may select the base information and the supplementary information of the metadata of the subtitles or transform the base information and deliver the subtitle data and the selected or transformed metadata to the graphics engine. To this end, it is possible to adaptively support the quality of the subtitles according to receiver. A detailed description thereof was given above.

The system information processor 1907 may receive SI information output from the demultiplexer 1907 and extract on screen display (OSD) information.

The graphics engine 1908 may receive the subtitles and the metadata of the subtitles from the XML subtitle decoder 1905 and output a subtitle image. The subtitle image is generated based on the subtitles and the metadata of the subtitles and the color, luminance, etc. of the output subtitle image may be changed depending on whether the metadata of the subtitles is converted.

The display processor 1909 may receive the video frame and the subtitles and output a display frame. The display processor 1909 may receive the OSD information in addition to the video frame and the subtitles and output the display frame. The output display frame may be displayed by an image output device and may be displayed along with the XML subtitles and video frame described in the present invention.

FIG. 21 is a diagram showing configuration of a program map table (PMT), an adaptation field data descriptor, and an adaptation field data identifier according to an embodiment of the present invention.

In one embodiment of the present invention relating to providing an XML-based broadcast media subtitle service, information that needs to be added to provide a subtitle service corresponding to high-quality image elements (wide color gamut; WCG, high dynamic range; HDR, higher bit depth, wider aspect ratio format, etc.) may be added to signaling of the system level. That is, in one embodiment of the present invention, only elements that need to be added without modifying the internal syntax of XML are allowed to be added to signaling of the system level. Here, the system level signaling may include an MPEG-2 TS adaptation field and DVB SAD auxiliary data, and may include a header extension of a typical transport packet.

In an embodiment of the present invention, the subtitle syntax produced based on the existing XML may be maintained, and additional functions not included in the existing timed text may be included in the MPEG-2 TS adaptation field, DVB SAD auxiliary data, header extension of the typical transport packet, or the like to provide an additional service. The receiver may be enabled to operate in accordance with the embodiment of the present invention. More specifically, an embodiment of the present invention may provide additional signaling only for a target subtitle among a plurality of subtitles using the above method, and information necessary for transformation of the aspect ratio of the subtitle may be additionally transmitted. Also, multiple color gamuts, dynamic ranges, EOTFs, bit depths, etc. supported by XML subtitles may be signaled, and information necessary for color gamut transformation and dynamic rage transformation may be additionally transmitted.

This figure shows signaling information required when information to be added in order to provide a subtitle service corresponding to high-quality image elements is included in the MPEG-2 TS adaptation field.

The adaptation field data descriptor L21020 according to an embodiment of the present invention may provide a method of indicating the type of data fields located in the private data field within the adaptation field. This descriptor may be included in the stream loop of the PMT. The adaptation field data descriptor L21020 may include a descriptor tag, a descriptor length, and/or an adaptation field data identifier. The descriptor tag may identify this descriptor and have 0x70 as a value identifying the adaptation field data descriptor. The descriptor length indicates the length of this descriptor. The adaptation field data identifier may be included in the private data bytes of the adaptation field to identify the transmitted data fields. The adaptation field data identifier may be represented by 8 bits. If the value of each bit is 1, this indicates that the corresponding data field is supported.

The adaptation field data identifier L21030 according to an embodiment of the present invention may be represented by 8 bits, wherein b0 (the first bit) may indicate whether the announcement switching data field (TS 101 154 [9]) is present in the adaptation field, b1 may indicate whether the AU_information data field (TS 101 154 [9]) is present, b1 may indicate whether PVR_assist_information_data_field (TS 101 154 [9]) is present, b3 may indicate whether tsap_timeline (DVB Blue Book A167-2 [i.10]) is present, b5 may indicate whether XML_subtitle_assist_ information_data_filed according to an embodiment of the present invention is present, and b4, b6 and b7 may indicate reserved_0 for future use.

The program map table (PMT) according to an embodiment of the present invention includes a table_id field, a section_syntax_indicator field, a section_length field, a program_number field, a version_number field, a current_next_indicator field, a section_number field, a last_section_number field, a PCR_PID field, a program_info_length field, a descriptor( ), a stream_type field, an elementary_PID field, an ES_info_length field, a descriptor( ), and/or a CRC_32 field. The table_id field identifies the type of the table. The table_id field may serve to indicate that the table section is a section constituting the PMT. The section_syntax_indicator field indicates the format of a table section following this field. If the value of the field is 0, this indicates that the table section is in short format. If the value of the field is 1, the table section conforms to the normal long format. The section_length field indicates the length of the table section. Since the section_length field indicates the length up to the end of the table section after the field, the actual length of the table section may be a value obtained by adding 3 bytes to the value indicated by the section_length field. The program_number field identifies each program service or virtual channel present in the transport stream. The version_number field indicates the version number of the private table section. The receiver may find the most recent table section among the table sections stored in the memory using this field and the current_next_indicator field, which will be described later. If the value indicated by the current_next_indicator field is 1, this indicates that the currently transmitted table is valid. If the current_next_indicator field is 0, this indicates that the currently transmitted table is not valid at present but will be valid hereafter. The section_number field indicates the position of the section in the table. The last_section_number field indicates the sequence number of the last section among the sections constituting the table. The PCR_PID field indicates a packet ID having PCR (Program Clock Reference) for a program service. The program_info_length field indicates the length of a descriptor indicating program_info that follows thereafter. Descriptor( ) means a descriptor indicating information about a program corresponding to the table section. The stream_type field indicates the type of each unit stream constituting the program described by the table. The elementary_PID field indicates the packet ID of each unit stream constituting the program described by the table. The ES_info_length field indicates the length of a descriptor indicating information (ES_info) about each unit stream to be followed thereafter. The descriptor( ) refers to a descriptor indicating information about one unit stream among the unit streams constituting the program described by the table. The adaptation field data descriptor according to an embodiment of the present invention may correspond to this descriptor. The CRC_32 field indicates a CRC value used for checking whether there is an error in the data included in the table section.

In one embodiment of the present invention, the adaptation field data descriptor may be included in the ES_info loop of the PMT, thereby signaling whether information to be added to provide a subtitle service corresponding to a high-quality image element is included in the adaptation field.

FIG. 22 is a diagram showing configuration of an adaptation field according to an embodiment of the present invention.

In an embodiment of the present invention, the XML_subtitle_assist_information_data_field may be included in the private_data_byte L22010 of the adaptation field. In this case, XML_subtitle_assist_information may be defined in the same manner as PVR assist info defined in DVB.

In another embodiment of the present invention, the adaptation_field_extension_length L22020 of the adaptation field may be extended to add a subtitle info assist flag to reserved L22030 and include the XML_subtitle_assist_information_data_field in the reserved L22040.

The adaptation field according to an embodiment of the present invention includes adaptation_field_length, discontinuity_indicator, random_access_indicator, elementary_stream_priority_indicator, PCR_flag, OPCR_flag, splicing_point_flag, transport_private_data_flag, adaptation_field_extension_flag, program_clock_reference_base, program_clock_reference_extension, original_program_clock_reference_base, original_program_clock_reference_extension, splice_countdown, transport_private_data_length, private_data_byte, adaptation_field_extension_length, ltw_flag, piecewise_rate_flag, seamless_splice_flag, ltw_valid_flag, ltw_offset, piecewise_rate, splice_type, DTS_next_AU, marker_bit and/or stuffing_byte. Adaptation_field_length indicates the length of the adaptation field. Discontinuity_indicator indicates whether or not the current TS packet is in a discontinuous state. Random_access_indicator indicates that the current TS packet contains information for random access. Elementary_stream_priority_indicator indicates that the packet has the highest priority among the packets having the same PID. PCR_flag indicates that the adaptation field contains a PCR field. OPCR_flag indicates that the adaptation field contains an OPCR field. Splicing_point_flag indicates that the adaptation field contains a splice countdown field indicating occurrence of the splicing point. Transport_private_data_flag indicates that the adaptation field contains one or more private data bytes. Adaptation_field_extension_flag indicates whether there is an adaptation field extension. Program_clock_reference_base and program_clock_reference_extension indicate parts constituting the PCR. Original_program_clock_reference_base and original_program_clock_reference_extension indicate parts constituting the OPCR. Splice_countdown indicates the number of TS packets having the same PID as the current TS packet in a range from the current TS packet to the splicing point. Transport_private_data_length indicates the number of private data bytes after this field. Private_data_byte indicates a field having 8 bits, and this field may include an XML_subtitle_assist_information_data_field according to an embodiment of the present invention. Adaptation_field_extension_length indicates the number of bytes of extended adaptation field data following this field. Ltw_flag indicates whether the ltw_offset field is present. Piecewise_rate_flag indicates whether a piecewise_rate field is present. The seamless_splice_flag indicates whether the splice type field and the DTS next AU field are present. Ltw_valid_flag indicates whether the ltw_offset field value is valid. Ltw_offset represents the legal time window offset value. Piecewise_rate indicates the hypothetical bitrate. Splice_type identifies the TS packet group to be spliced. DTS_next_AU indicates the decoding time of the next access unit. The marker_bit identifies the access unit. Stuffing_byte indicates the bit inserted by the encoder.

FIG. 23 is a diagram showing configuration of XML subtitle assist information and a data_field_tag value included in XML subtitle assist information according to an embodiment of the present invention.

Subtitle XML assist information L23010 according to an embodiment of the present invention includes data_field_tag, data_field_length, TargetFlag, NumOfTarget, SubtitleID and/or SubtitleInfo( ).

Data_field_tag L23020 identifies the data field. Among the values of the field, 0x00 indicates reserved, 0x01 indicates the Announcement switching data field, 0x02 indicates the AU_information data field, 0x03 indicates the PVR_assist_information data field, 0x04 indicates DVB reserved, 0x05 indicates XML_subtitle_assist_information_data_field, 0x06 to 0x9F indicate reserved for future use, and 0xA0 to 0xFF indicate user defined. The values of data field tag, 0x01, 0x02, 0x03, and 0x05, may correspond to the values represented by b0, b1, b2 and b5 of adaptation_field_data_identifier in the adaptation field data descriptor, respectively.

Data_field_length indicates the length of this descriptor excluding the lengths of data_field_tag and data_field_length.

TargetFlag indicates whether the SubtitleInfo( ) is information only for the target stream or all subtitle streams when there are multiple subtitle streams. If the value of TargetFlag is 1, one embodiment of the present invention may transmit and apply information of SubtitleInfo( ) only to a specific XML subtitle stream. If the value of TargetFlag is 0, the information of SubtitleInfo( ) may be transmitted and applied to various streams.

NumOfTarget indicates the number of target streams to which the information of SubtitleInfo( ) is applied. This field indicates whether the same SubtitleInfo( ) can be applied to several subtitle streams. For example, if the SubtitleInfo( ) is applied to only one stream, the value of this field is 1, and SubtitleInfo( ) may be applied to only one SubtitleID.

SubtitleID is an identifier that identifies the XML subtitle stream. When there are multiple subtitle streams in one service (for example, multi-language subtitle streams), SubtitleInfo( ) applied to each stream may be different, and each stream may be distinguished using SubtitleID.

SubtitleInfo( ) may represent the information of the subtitle that was the basis when the XML subtitle was produced. This information may be transmitted in the adaptation field, auxiliary data and/or header extension of a transport packet.

In an embodiment of the present invention, only elements included in a corresponding subtitle stream may be signaled from outside SubtitleInfo( ) by using a flag for all elements such as the aspect ratio, peak brightness, black level, contrast ratio, EOTF, bit depth, and color gamut. This is because SubtitleInfo( ) may not contain information about all elements contained in the subtitle. For example, if the subtitle stream includes the Gamut and PeakBrightness elements, a flag for the elements may be marked and signaled for the two elements (L23030).

FIG. 24 is a diagram showing configuration of SubtitleInfo( ) according to an embodiment of the present invention.

According to one embodiment of the present invention, SubtitleInfo( ) L24010 includes SubtitleType, SubtitleAspectRatio, MinSubtitleAspectRatio, MaxSubtitleAspectRatio, SubtitlePeakBrightness, SubtitleBlackLevel, SubtitleContrastRatio, SubtitleEOTF, SubtitleBitDepth, GamutTypeFlag, SubtitleGamut, SubtitlePrimaryRx, SubtitlePrimaryRy, SubtitlePrimaryGx, SubtitlePrimaryGy, SubtitlePrimaryBx, SubtitlePrimaryBy, SubtitlePrimaryWx and/or SubtitlePrimaryWy.

SubtitleType indicates the type of XML-based subtitle, for example, which of EBU-TT-D, Timed text, IMSC1 and TTML the subtitle conforms to.

SubtitleAspectRatio indicates the aspect ratio of the subtitle, which indicates what aspect ratio the subtitle was produced in. This field may indicate the proportion of the window itself in which the subtitle may be displayed, or the aspect ratio of the display most suitable for the subtitle. For example, if this field presents 4:3 as an aspect ratio, this field indicates that the subtitle is designed to be suitable for a display with a 4:3 aspect ratio. That is, the most natural view of the subtitle is obtained when viewed on a display with a 4:3 aspect ratio. When the production environment of the subtitles is different from the aspect ratio of the actual receiver display, an embodiment of the present invention may convert the aspect ratio of the subtitles. For example, one embodiment of the present invention may use the automatic line wrap option included in the existing XML subtitle signaling, ignore the </br> function, or combine several paragraphs into one paragraph. Alternatively, one embodiment of the present invention may provide a subtitle service by sending a request to find a subtitle that has the same aspect ratio as the receiver display, and receive the requested subtitle of the IP network or another channel to provide the subtitle service. Among the values of the SubtitleAspectRatio, 0x0 indicates 4:3 aspect ratio, 0x1 indicates 16:9 aspect ratio, and 0x2 indicates 21:9 aspect ratio;

AdditionalAspectRatioFlag indicates whether the range of aspect ratios (max/min) within which the subtitle stream is allowed to be displayed needs to be sent.

MinSubtitleAspectRatio and MaxSubtitleAspectRatio may signal the aspect ratios to which the subtitle may be applied. Another embodiment of the present invention may signal only the min/max subtitle aspect ratios without signaling of SubtitleAspectRatio. For example, if the video is a 16:9 stream, the aspect ratio of the display is 4:3, and the subtitle has been created in a 16:9 environment (SubtitleAspectRatio=16:9), the video should be cropped since the 16:9 video stream needs to be displayed on the 4:3 display. Similar to the case of the video, the subtitles need information about whether the subtitles will be normally displayed even if they are cropped to fit the 4:3 aspect ratio. If the MinSubtitleAspectRatio according to an embodiment of the present invention indicates 4:3, no problem will occur when the receiver crops the subtitles to the 4:3 aspect ratio. In contrast, an embodiment of the present invention may signal, through MaxSubtitleAspectRatio, the maximum range of the aspect ratio of the display on which the subtitle is to be displayed. For example, if a subtitle for 4:3 is displayed on a 21:9 display, the space may be inefficiently utilized. In an embodiment of the present invention, the maximum aspect ratio may be signaled to display the subtitles in a proper form according to the subtitle configuration. According to an embodiment of the present invention, in displaying a dialogue between characters, MinSubtitleAspectRatio and/or MaxSubtitleAspectRatio may be used as indicators for determining whether or not the dialog between Character A and Character B can be displayed in region 1 and region 2 separately. An embodiment of the present invention may overcome differences in display, video and/or subtitle characteristics using MinSubtitleAspectRatio and/or MaxSubtitleAspectRatio.

SubtitlePeakBrightness, SubtitleBlackLevel, and SubtitleContrastRatio are fields related to a dynamic range, and indicate the maximum brightness of a subtitle, the minimum brightness of the subtitle, and a ratio of the maximum brightness to the minimum brightness ratio, respectively. For example, if the ratio of the maximum brightness to the minimum brightness of the subtitle is 10,000:1, the SubtitleContrastRatio may indicate 10,000 as a value. The SubtitlePeakBrightness and SubtitleBlackLevel values are expressed in units of nit (cd/m^2), and the value of the minimum brightness may be less than or equal to 1 (Low-Tone). Accordingly, SubtitleBlackLevel may indicate a value corresponding to OriginalValue*10000.

SubtitleEOTF represents the EOTF information used in relation to the dynamic range. If the value of this field is 0x0, this indicates BT.1886. If the value of this field is 0x1, this indicates that EOTF defined in SMPTE 2084 is used.

SubtitleBitDepth indicates the maximum bit depth that may be provided by the subtitle system. This field may be used as a criterion for comparing the bit depth of the subtitle with the bit depth of the receiver or an image. Alternatively, this field may be used to notify or detect that a bit depth of 8 bits or more is used. If the value of this field is 0x0, this indicates 8 bits. If the value of this field is 0x1, this indicates 10 bits. If the value of this field is 0x2, this indicates 12 bits. According to an embodiment of the invention, the SubtitleBitDepth field is used and, if the bit depth corresponding to a subtitle having a value of 9 bits or more, an embodiment of the present invention may additionally deliver SubtitleColorExtR, SubtitleColorExtG and/or SubtitleColorExtB fields.

GamutTypeFlag is a field that indicates whether the container, the content and/or the color gamut of the subtitle are arbitrarily defined. If the value of this field is 0, this indicates that a color gamut designated as a standard has been used. If the value of this field is 1, this indicates that an arbitrarily defined color gamut has been used and coordinates of the three primary colors in the color space are transmitted.

SubtitleGamut indicates the type of the color gamut of the subtitle used at the time of production. For example, the color gamut may represent sRGB and/or BT.2020.

SubtitlePrimaryRx, SubtitlePrimaryRy, SubtitlePrimaryGx, SubtitlePrimaryGy, and SubtitlePrimaryBx, SubtitlePrimaryBy indicate x and y coordinates of RGB colors in a color space (e.g., CIE 1931) to express the arbitrarily defined color gamut. These fields may present binarized values between 0 and 1, or may present a difference from a reference value.

SubtitlePrimaryWx and SubtitlePrimaryWy indicate the x and y coordinates of a white point in a color space (e.g., CIE 1931) to represent an arbitrarily defined color gamut. These fields may present binarized values between 0 and 1, or may present a difference from a reference value.

In an embodiment of the present invention, a flag may be used to signal only necessary elements in place of signaling all elements including the aspect ratio, peak brightness, black level, contrast ratio, EOTF, bit depth, and color gamut of a subtitle. For example, 0 and 1 may be used as the values of a flag to indicate whether the gamut of the subtitle is identical to the gamut of the video, and additional signaling for the gamut of the subtitle may be provided only when the gamut of the video differs from that of the subtitle (L24020)

FIG. 25 is a diagram showing configuration of auxiliary_data_structure( ) and a payload_format field according to an embodiment of the present invention.

In another embodiment of the present invention, XML_subtitle_assist_information( ) described above may be included in PES_packet_data_byte in PES_packet( ) so as to be transmitted. Auxiliary_data_structure( ) according to an embodiment of the present invention may be included in PES_packet_data_byte in PES_packet( ).

Auxiliary_data_structure( ) L25010 according to an embodiment of the present invention includes payload_format, CRC_flag, payload_byte and/or CRC_32.

Payload_format L25020 indicates the format used to encode the payload. If the value of this field is 0x8, this indicates that XML_subtitle_assist_information( ) is included in the payload. If the value of this field is 0x9 this may indicate that the actual text of the XML subtitle (TTML, EBU-TT-D, IMSC1, etc.) is included in the payload.

CRC_flag indicates whether or not the CRC_32 field is present.

Payload_byte contains XML_subtitle_assist_information( ) if payload_format is 0x8. Details of XML_subtitle_assist_information( ) have been described above. If XML_subtitle_assist_information( ) is contained in the auxiliary data so as to be transmitted as in an embodiment of the present invention, XML_subtitle_assist_information( ) may not include any of data_field_tag and data_field_length.

CRC_32 indicates a CRC value of 32 bits.

Figure 26:
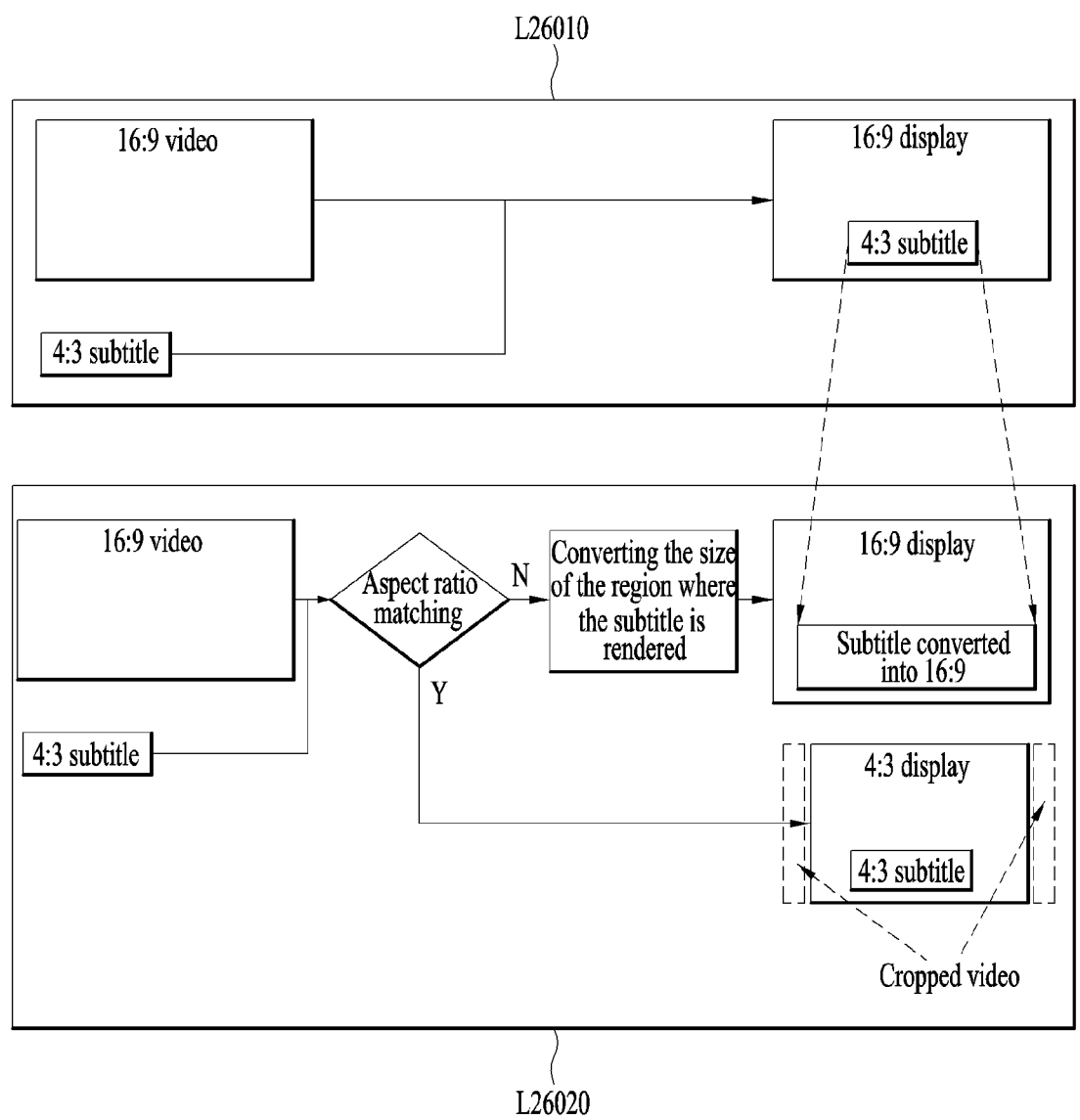
FIG. 26 is a diagram showing a process of converting the aspect ratio of a subtitle according to an embodiment of the present invention.

FIG. 26 is a diagram showing a process of converting the aspect ratio of a subtitle according to an embodiment of the present invention.

IMSC1 contains information about the aspect ratio of the container region in which the subtitle is allowed to be displayed in ittp:aspectRatio, but EBU-TT-D does not contain this information. In an embodiment of the present invention, the XML internal text may not be modified to signal necessary information, but only necessary elements (e.g., aspect ratio) may be signaled using the TS adaptation field, auxiliary data and/or header extension.

The XML text related to the aspect ratio in IMSC1 is given as follows. According to an embodiment of the invention, the value of ittp:aspectRatio may be equal to the value of the SubtitleAspectRatio field of XML_subtitle_assist_information( ) described above. If the value of ittp:aspectRatio in the XML of IMSC1 is different from that of the SubtitleAspectRatio field, an embodiment of the present invention may pre-define the value of the SubtitleAspectRatio field of XML_subtitle_assist_information( ) as being prioritized.

```
<tt
xmlns="http://www.w3.org/ns/ttml"
xmlns:ttm="http://www.w3.org/ns/ttml#metadata"
xmlns:tts="http://www.w3.org/ns/ttml#styling"
xmlns:ttp="http://www.w3.org/ns/ttml#parameter"
xmlns:ittp="http://www.w3.org/ns/ttml/profile/imsc1#parameter"
ittp:aspectRatio="4 3"
>
...
</tt>
```

EBU-TT-D and/or TTML1 contain aspect ratio information in the pixels, but do not contain information about the aspect ratio of the container region in which the subtitle may be displayed. In an embodiment of the present invention, EBU-TT-D and/or TTML1 subtitle may be allowed to contain information about SubtitleAspectRatio. If the aspect ratio of the subtitle does not match the aspect ratio of the display and/or video, the aspect ratios of the subtitle, display, and/or video may be converted. In another embodiment of the present invention, the EBU-TT-D and/or TTML1 subtitle may further include aspect ratio information in the Header in XML as in the case of IMSC1.

In an embodiment of the present invention, to convert the aspect ratio of the subtitle, the area of the container region in which the subtitle is displayed may be converted to fit the display and/or video aspect ratio, and the automatic line wrap option may be used. For example, TTML1, EBU-TT and/or EBU-TT-D include signaling as follows:

```
<style tts:wrapOption="noWrap"/>: No automatic wrapping
<style tts:wrapOption="wrap"/>: Automatic wrapping available
```

If the value of wrapOption, which represents the automatic line wrap option, is wrap, an embodiment of the present invention may output the subtitle by continuing the subtitle on a new line such that the lines fit the converted container region. That is, the text that would be displayed on one line may automatically continue on the next line, and or the text continued on the next line may be displayed on one line. Therefore, when the area of the container region in which the subtitle is displayed is widened, sentences continued on two or more lines may be displayed on a single line. A sentence that cannot be displayed on one line even in the widened region may be continued on the next line by the automatic line wrap option. On the other hand, if the value of wrapOption, the automatic line wrap option, is noWrap, automatic line wrapping is not possible. Meanwhile, since IMSC1 does not support the automatic line wrap function, an embodiment of the present invention may include the automatic line wrap option in a header as in the case of TTML, EBU-TT, and EBU-TT-D.

Referring to the figure (L26010 and L26020), when a subtitle created targeting 4:3 aspect ratio is displayed on a screen with a 16:9 aspect ratio (L26010), the aspect ratio of the subtitle is to be converted for efficient use of the screen. In an embodiment of the present invention, the aspect ratios of the subtitle, and the video and/or display are compared with each other, and if they do not match (e.g., the video/display: 16:9, the subtitle: 4:3), the size of the region (container region) in which the subtitle is rendered may be converted to match the aspect ratio of the subtitle with that of the display. Alternatively, if the subtitle and the display have the same aspect ratio, but the aspect ratio of the subtitle is different from that of the video (subtitle/display: 4:3, video: 16:9), the video whose aspect ratio is 16:9 may be cropped to match the aspect ratios of subtitle, video and/or display. In an embodiment of the present invention, regardless of whether or not the display and the subtitle have the same aspect ratio, it is determined whether to convert the aspect ratio of the subtitle by checking the Min/max subtitle aspect ratio information. Here, the aspect ratio of the subtitle may mean the aspect ratio of the display targeted at the time of production, the container region may mean the area on the screen where the subtitle is displayed or rendered, and the subtitle may have the same meaning as a caption.

Figure 27:
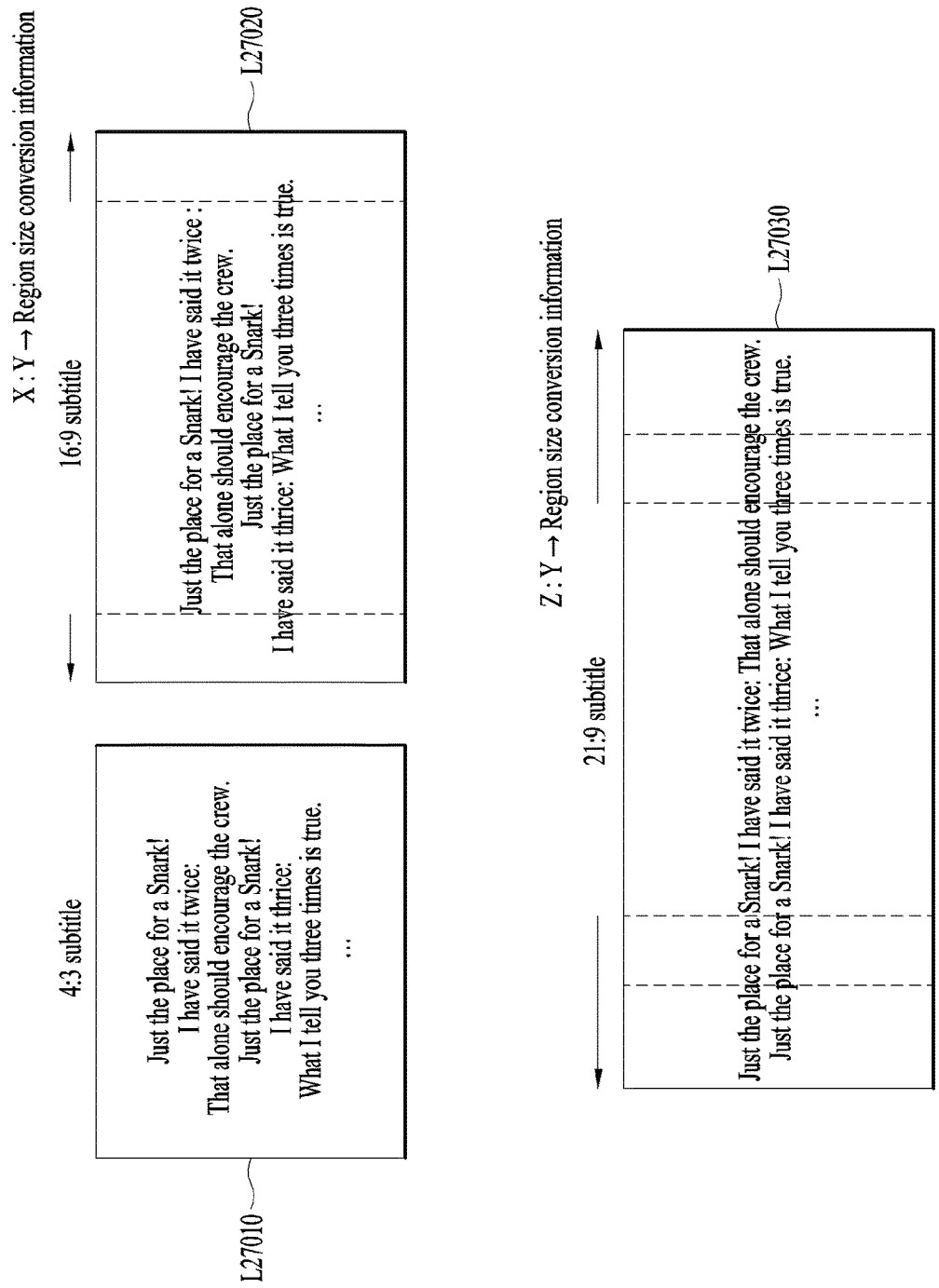
FIG. 27 is a diagram showing a process of displaying subtitles created by targeting a screen having a 4:3 aspect ratio on 16:9 and 21:9 screens according to an embodiment of the present invention.

FIG. 27 is a diagram showing a process of displaying subtitles created by targeting a screen having a 4:3 aspect ratio on 16:9 and 21:9 screens according to an embodiment of the present invention.

In an embodiment of the present invention, when the automatic line wrap option is enabled, the aspect ratio of the subtitle may be compared with the aspect ratio of the display, and then the container region in which the subtitle is displayed may be enlarged. According to an embodiment of the present invention, a component of the receiver that performs preprocessing may determine how much to enlarge the container region and transfer region size conversion information to a graphics engine, and the graphics engine may convert the size of the container region. For example, in this figure, when a subtitle L27010 created targeting a screen having a 4:3 aspect ratio is to be displayed on a 16:9 screen, an embodiment of the present invention may use region size conversion information in the form of X:Y to expand the container region to the left and right by an area corresponding to 2:9, respectively (L27020). In this figure, when a subtitle L27010 created targeting a screen having a 4:3 aspect ratio is displayed on a 21:9 screen, an embodiment of the present invention may display region size conversion information in the form of Z:Y to expand the container region to the left and right by an area corresponding to 4.5:9, respectively (L27030)

According to an embodiment of the present invention, as the container region becomes wider, a plurality of paragraphs may be combined and displayed in one paragraph. In other words, multiple lines of text may be integrated into a single line to be displayed. In this case, the time at which the paragraph of the subtitle is displayed may be changed due to automatic line wrapping of the subtitle. For example, according to an embodiment of the present invention, when subtitle1 and subtitle2 each composed of independent paragraphs are output as a single paragraph, the time at which the single integrated paragraph is displayed may be begin="0.76 s", end="10.0 s", as shown below.

```
<p xml:id="subtitle1" begin="0.76s" end="3.45s">
    Just the place for a Snark!
</p>
<p xml:id="subtitle2" begin="5.0s" end="10.0s">
    I have said it twice:</p>
```

According to another embodiment of the present invention, the text may be output, ignoring <br/> with the composition of the paragraph maintained. In this case, the display time of each paragraph does not change. For example, the subtitle 2, which is a second paragraph, may be output in a row with the function of <br/> in the middle of the text being ignored according to an embodiment of the present invention, as shown below.

```
<p xml:id="subtitle1"begin="0.76s" end="3.45s">
    It seems a paradox, does it
not, </p>
    <p xml:id="subtitle2" begin="5.0s" end="10.0s">
    that the image formed
on<br/>the Retina should be inverted? </p>
```

In another embodiment of the present invention, after the aspect ratio of the subtitle is compared with the aspect ratio of the display, the font size of the subtitle text may be converted. At this time, the component of the receiver configured to perform preprocessing may determine how much to increase or reduce the text font size and transfer the font size conversion information to the graphics engine, and the graphics engine may convert the font size.

In an embodiment of the present invention, the aspect ratio range of the subtitle may be signaled as described above. That is, the aspect ratio range of the screen to which the subtitle may be applied may be delivered in the form of the min/max values. The receiver may check the range. The receiver may output the subtitle without change if the aspect ratio of the screen is between min/max. Otherwise, the receiver may convert the aspect ratio of the subtitle. Here, converting the aspect ratio of the subtitle may have the same meaning as converting the size of the container region in which the subtitle will be output.

Figure 28:
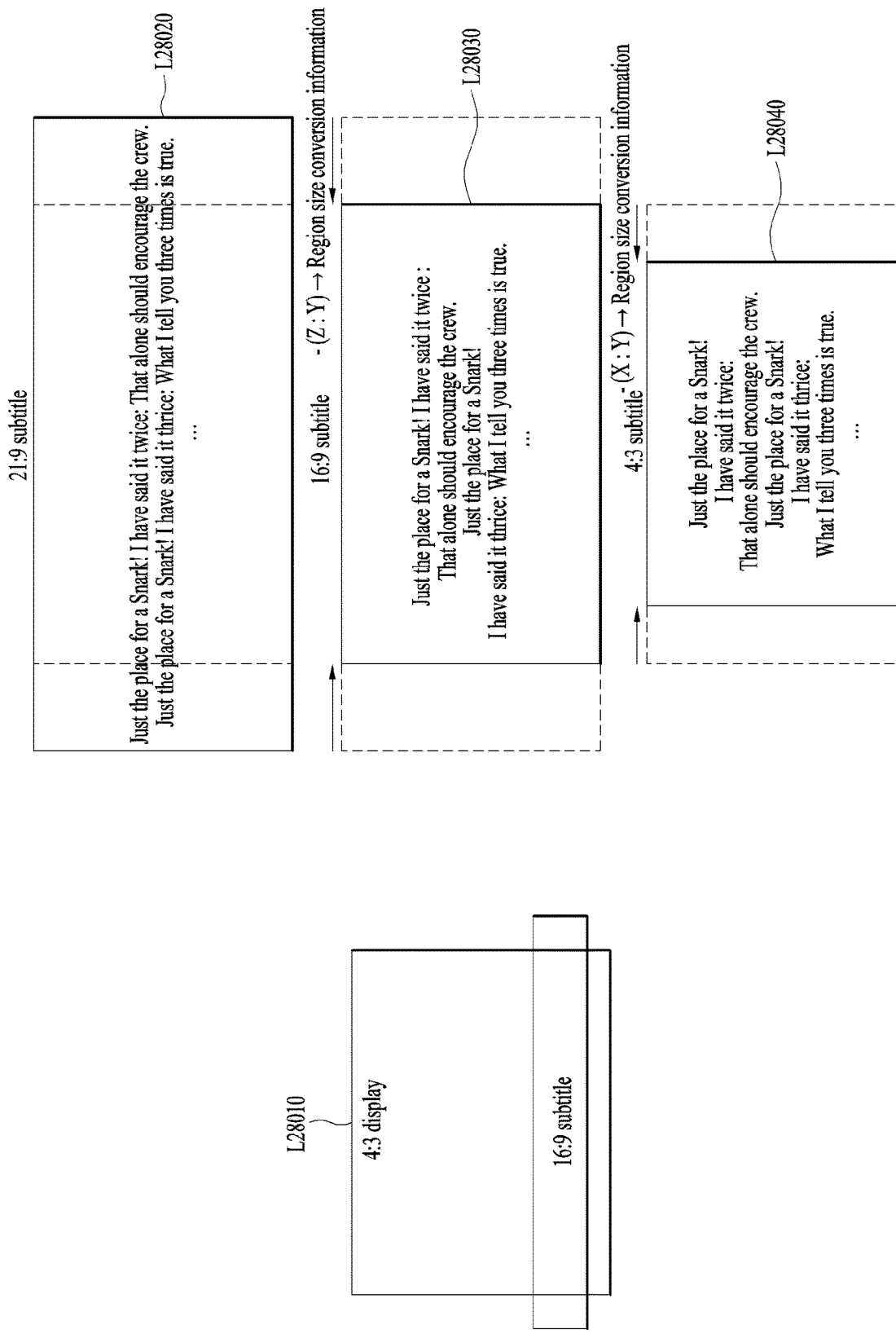
FIG. 28 is a flowchart showing a process of outputting a subtitle having a 16:9 aspect ratio on a 4:3 screen and a process of transformation of the aspect ratio of a 21:9 subtitle when the subtitle is output to a 21:9 screen, a 16:9 screen, and a 4:3 screen according to an embodiment of the present invention.

FIG. 28 is a flowchart showing a process of outputting a subtitle having a 16:9 aspect ratio on a 4:3 screen and a process of transformation of the aspect ratio of a 21:9 subtitle when the subtitle is output to a 21:9 screen, a 16:9 screen, and a 4:3 screen according to an embodiment of the present invention.

The left diagram L28010 shows the process of outputting a subtitle with a 16:9 aspect ratio on a 4:3 screen. In an embodiment of the present invention, it may be checked through the MinAspectRatio value whether the subtitle can be output on the 4:3 screen without cropping. If the MinAspectRatio value is 16:9, the subtitle may have a cropped portion as shown in the diagram L28010. In this case, the component of the receiver configured to perform preprocessing may calculate size information and transmit, to the graphics engine, information indicating that a region corresponding to X:Y should be reduced on the left and right, such that so as the container region of the subtitle may be converted. Based on the region size conversion information, the graphics engine may downsize the container region.

In an embodiment of the present invention, when the automatic line wrap option is enabled, text may be output in a narrowed subtitle area through line wrapping of the subtitle. For example, referring to the right diagrams L28020, L28030, L28040, the container region L28020 in which a 21:9 subtitle is rendered is downsized to a container region L28030 having a size suitable for a 16:9 subtitle by the region size conversion information (X:Y), and the container region L28030 in which the 16:9 subtitle is rendered may be downsized to a container region L28040 of a size suitable for a 4:3 subtitle by the region size conversion information (X:Y).

Figure 29:
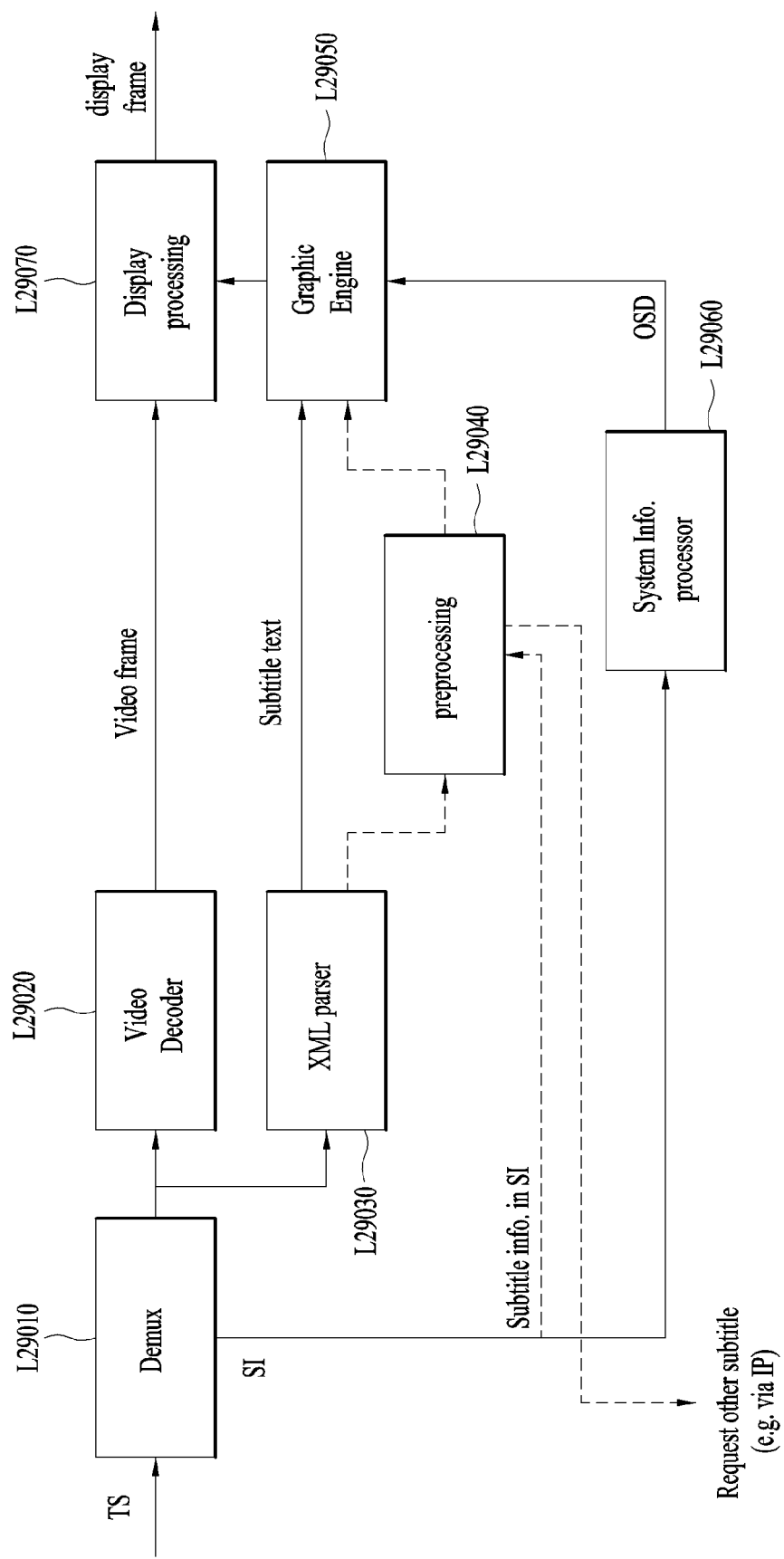
FIG. 29 is a diagram showing configuration of a reception device according to an embodiment of the present invention.

FIG. 29 is a diagram showing configuration of a reception device according to an embodiment of the present invention.

The reception device according to an embodiment of the present invention includes a demux L29010, a video decoder L29020, an XML parser L29030, a preprocessing unit L29040, a graphics engine L29050, a system Info processor L29060, and a display processing unit L29070.

The demux L29010 may separate the video, the subtitle and/or system level signaling when a TS packet is input.

The video decoder L29020 may decode video data.

The XML parser L29030 may parse the XML in a broadcast signal.

The preprocessing unit L29040 may identify display characteristics and video characteristics, and identify the characteristics of the subtitle based on the TS adaptation field, the auxiliary data, the header extension of the transport packet, and/or the metadata in the XML according to an embodiment of the present invention. Further, the preprocessing unit and/or the graphics engine may adjust the size of the container region in which the subtitle is output when the aspect ratio of the display and/or video is different from the aspect ratio of the subtitle. For this operation, the preprocessing unit and/or the graphics engine may check the range of the aspect ratio within which the subtitle is allowed to be output without being converted, and may output the subtitle without changing the aspect ratio of the subtitle if it is within the range. If the subtitle is outside of range, a subtitle stream with a different aspect ratio may be requested and a new subtitle stream may be output. According to an embodiment of the present invention, elements such as bit depth, dynamic range, and color gamut of the subtitle may be converted to fit the characteristics of the display and the video in a preprocessing step (the preprocessing unit and/or the graphics engine). In this operation, the receiver according to an exemplary embodiment of the present invention may selectively convert the color, brightness, bit depth, aspect ratio information, and the like provided in the subtitle according to the type of service that may be received.

The graphics engine L29050 performs a conversion operation to reproduce text information as image information.

The system Info processor L29060 processes signaling information transmitted at the system level. According to an embodiment of the present invention, when the XML_subtitle_assist_information( ) is transmitted including the adaptation field, auxiliary data, and/or transport packet header extension, the system Info processor L29060 may process the corresponding signaling information.

The display processing unit L29070 may configure an image for final display by integrating elements for images, subtitles, and other image configurations.

Figure 30:
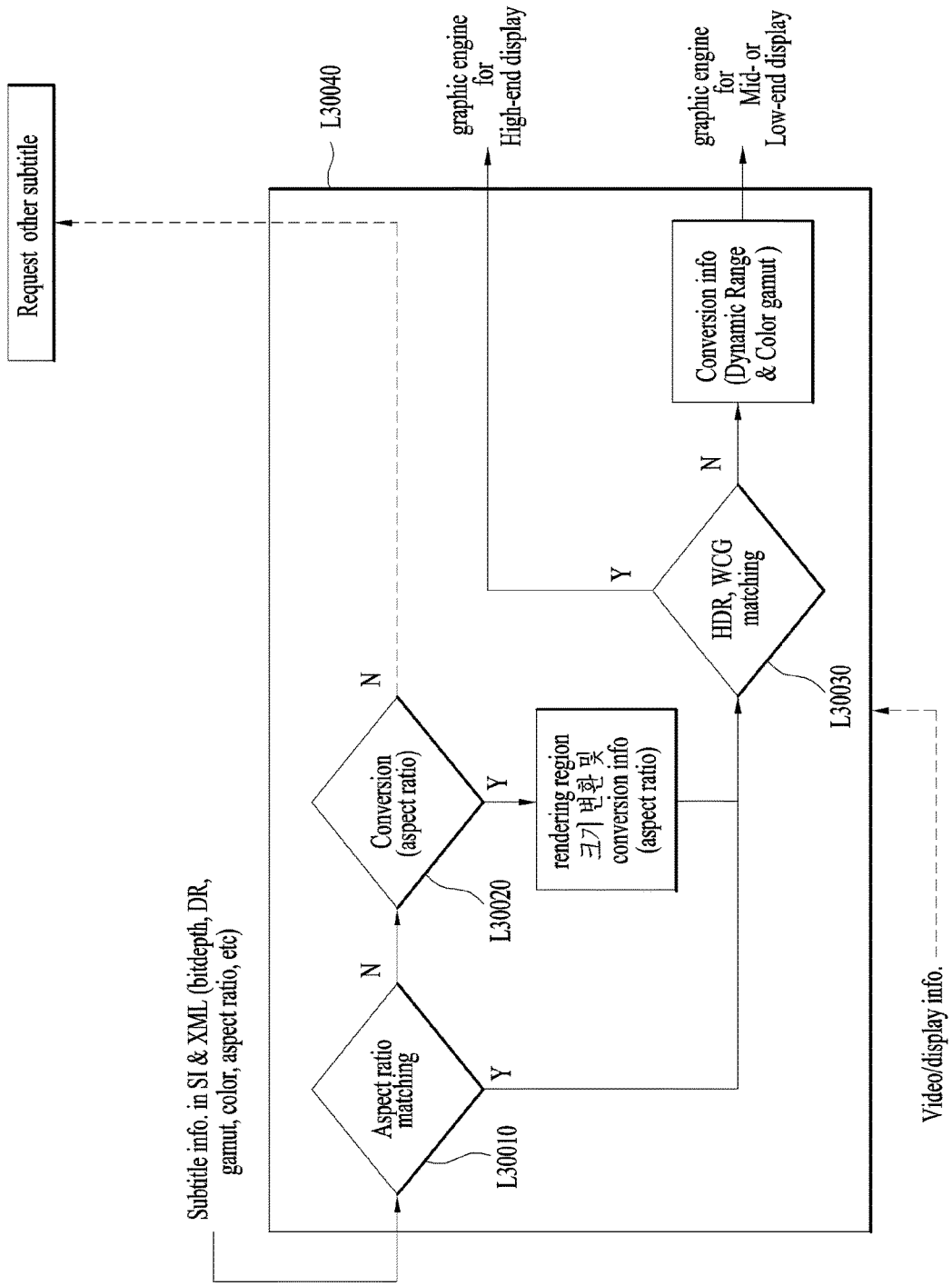
FIG. 30 is a diagram showing a preprocessing process of a preprocessing unit according to an embodiment of the present invention.

FIG. 30 is a diagram showing a preprocessing process of a preprocessing unit according to an embodiment of the present invention.

In an embodiment of the present invention, preprocessing may be performed using subtitle information transmitted in system information (SI), information transmitted in the XML, such as the bit depth, the dynamic range, the gamut, the color, and the aspect ratio, video characteristics information, and/or display characteristics information (L30040).

The preprocessing unit may compare the aspect ratio information on the subtitle, the aspect ratio information on the display, and/or the aspect ratio information on the video to determine whether they match each other (L30010).

If they do not match each other in the matching operation (L30010), the preprocessing unit may check the aspect ratio range within which the corresponding subtitle is applicable. If the subtitle is applicable, the preprocessing unit may convert the size of the rendering region (container region) of the subtitle or produce region size conversion information. Otherwise, the preprocessing unit may request reception of a different subtitle (L30020).

The preprocessing unit may compare the WCG/HDR information of the subtitle, the WCG/HDR information of the video, and/or the WCG/HDR information of the display to determine whether they match each other. If they match each other, the corresponding subtitle may be transmitted to a graphics engine for high-end display to which HDR and/or WCG is applicable. Otherwise, the corresponding subtitle may be transmitted to a graphics engine for mid or low-end displays to which the HDR and/or WCG is not applicable (L30030).

Figure 31:
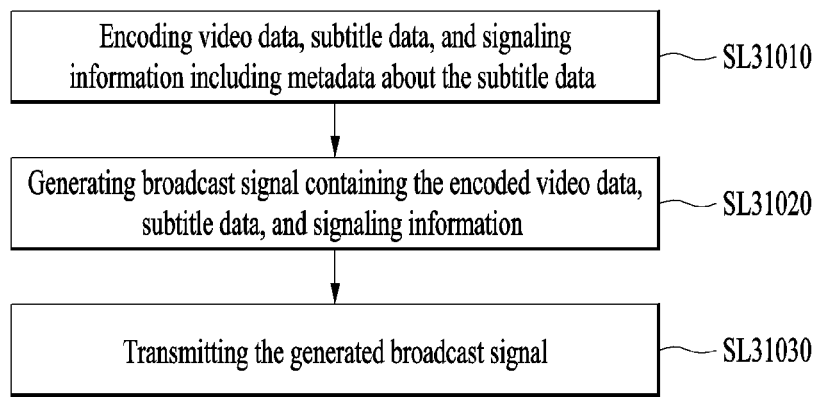
FIG. 31 is a diagram showing a broadcast signal transmission method according to an embodiment of the present invention.

FIG. 31 is a diagram showing a broadcast signal transmission method according to an embodiment of the present invention.

According to an embodiment of the present invention, a method for transmitting a broadcast signal may include encoding video data, subtitle data, and signaling information including metadata about the subtitle data (SL31010), generating a broadcast signal containing the encoded video data, subtitle data and signaling information (SL31020), and/or transmitting the generated broadcast signal (SL31030). Here, the metadata about the subtitle data may represent XML_subtitle_assist_information( ) and/or SubtitleInfo( ) A detailed description thereof has been given above in the description of FIGS. 23 and 24.

According to another embodiment of the present invention, the metadata may include information on the aspect ratio of a display targeted for production of the subtitle data and/or the maximum and minimum aspect ratio of the display to which the subtitle data is applicable. Here, the aspect ratio information on the display targeted for production of the subtitle data may indicate SubtitleAspectRatio and/or the aspect ratio of the subtitle. That is, the aspect ratio information indicates the aspect ratio of the display environment at the time of production of the subtitle data. The maximum and minimum aspect ratio information on the display to which the subtitle data is applicable may indicate MaxSubtitleAspectRatio and MinxSubtitleAspectRatio. A detailed description thereof has been given above in the description of FIG. 24.

According to another embodiment of the invention, the metadata may include maximum and minimum brightness information on the subtitle data, bit depth information on the subtitle data, EOTF (Electro-Optical Transfer Function) information applied to the subtitle data and/or color gamut information on the subtitle data. Here, the maximum and minimum brightness information on the subtitle data may represent SubtitlePeakBrightness and SubtitleBlackLevel, the bit depth information on the subtitle data may represent SubtitleBitDepth, the EOTF information applied to the subtitle data may represent SubtitleEOTF, and the color gamut information on the subtitle data may represent the SubtitleGamut. A detailed description thereof has been given above in the description of FIG. 24.

According to another embodiment of the present invention, the metadata may be transmitted in at least one of the adaptation field of an MPEG (Moving Picture Experts Group)-2 TS (Transport Stream), the DVB (digital video broadcasting) auxiliary data and/or the header of the transport packet. A detailed description thereof has been given above in the description of FIGS. 22 and 25.

According to another embodiment of the present invention, the signaling information may include information for identifying that the information included in the adaptation field is metadata about the subtitle data. A detailed description thereof has been given above in the description of FIG. 21.

According to another embodiment of the present invention, the auxiliary data may include information for identifying that the information included in the auxiliary data is metadata about the subtitle data. A detailed description thereof has been given above in the description of FIG. 25.

Figure 32:
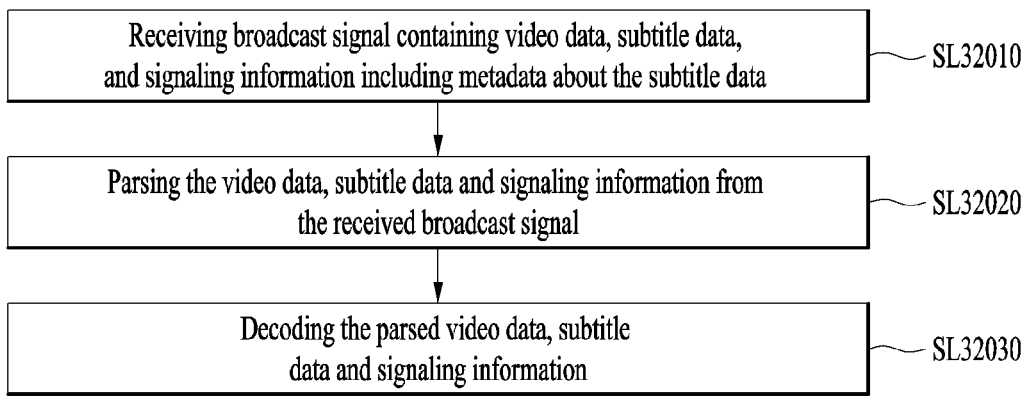
FIG. 32 is a diagram showing a broadcast signal reception method according to an embodiment of the present invention.

FIG. 32 is a diagram showing a broadcast signal reception method according to an embodiment of the present invention.

According to an embodiment of the present invention, a method for receiving a broadcast signal may include receiving a broadcast signal containing video data, subtitle data, and signaling information including metadata about the subtitle data (SL32010), parsing the video data, subtitle data and signaling information from the received broadcast signal (SL32020), and/or decoding the parsed video data, subtitle data and signaling information (SL32030). A detailed description thereof has been given above in the description of FIGS. 23, 24 and 29.

According to another embodiment of the present invention, the metadata may include information on the aspect ratio of a display targeted for production of the subtitle data and/or the maximum and minimum aspect ratio of the display to which the subtitle data is applicable. Here, the aspect ratio information on the display targeted for production of the subtitle data may indicate SubtitleAspectRatio and/or the aspect ratio of the subtitle. That is, the aspect ratio information indicates the aspect ratio of the display environment at the time of production of the subtitle data. The maximum and minimum aspect ratio information on the display to which the subtitle data is applicable may indicate MaxSubtitleAspectRatio and MinxSubtitleAspectRatio. A detailed description thereof has been given above in the description of FIG. 24.

According to another embodiment of the invention, the metadata may include maximum and minimum brightness information on the subtitle data, bit depth information on the subtitle data, EOTF (Electro-Optical Transfer Function) information applied to the subtitle data and/or color gamut information on the subtitle data. Here, the maximum and minimum brightness information on the subtitle data may represent SubtitlePeakBrightness and SubtitleBlackLevel, the bit depth information on the subtitle data may represent SubtitleBitDepth, the EOTF information applied to the subtitle data may represent SubtitleEOTF, and the color gamut information on the subtitle data may represent the SubtitleGamut. A detailed description thereof has been given above in the description of FIG. 24.

According to another embodiment of the present invention, the metadata may be transmitted in at least one of the adaptation field of an MPEG (Moving Picture Experts Group)-2 TS (Transport Stream), the DVB (digital video broadcasting) auxiliary data and/or the header of the transport packet. A detailed description thereof has been given above in the description of FIGS. 22 and 25.

According to another embodiment of the present invention, the signaling information may include information for identifying that the information included in the adaptation field is metadata about the subtitle data. A detailed description thereof has been given above in the description of FIG. 21.

According to another embodiment of the present invention, the auxiliary data may include information for identifying that the information included in the auxiliary data is metadata about the subtitle data. A detailed description thereof has been given above in the description of FIG. 25.

According to another embodiment of the present invention, the method for receiving a broadcast signal may further include converting the size of a region in which the decoded subtitle data is output, using the information on the aspect ratio of the display targeted for production of the subtitle data and/or the maximum and minimum aspect ratio of the display to which the subtitle data is applicable, and/or outputting the converted subtitle data and the decoded video data. Here, the region in which the subtitle data is output may represent a container region. A detailed description thereof has been given above in the description of FIGS. 26, 27, 28, 29 and 30.

Figure 33:
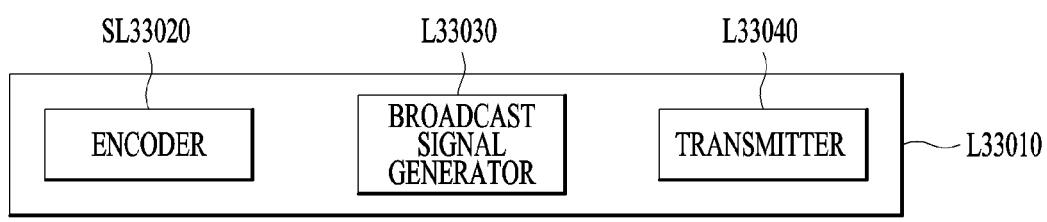
FIG. 33 is a diagram showing configuration of a broadcast signal transmission device according to an embodiment of the present invention.

FIG. 33 is a diagram showing configuration of a broadcast signal transmission device according to an embodiment of the present invention.

According to an embodiment of the preservation, a broadcast signal transmission apparatus L33010 may include an encoder L33020, a broadcast signal generator L33030, and/or a transmitter L33040.

The encoder may encode video data, subtitle data, and signaling information including metadata about the subtitle data. The encoder may correspond to the video encoding (HEVC) component described above.

The broadcast signal generator may generate a broadcast signal containing the encoded video data, subtitle data, and signaling information. The broadcast signal generator may correspond to the Synch and Multiplexing and Transport component and/or the Channel Coding and Modulation component described above.

The transmitter may transmit the generated broadcast signal.

Figure 34:
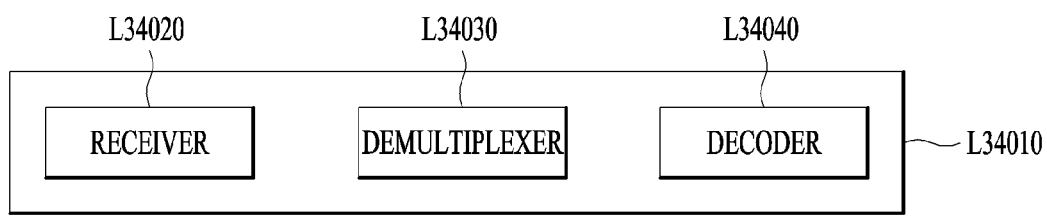
FIG. 34 is a diagram showing a broadcast signal reception device according to an embodiment of the present invention.

FIG. 34 is a diagram showing a broadcast signal reception device according to an embodiment of the present invention.

According to an embodiment of the present invention, a broadcast signal reception device L34010 may include a receiver L34020, a demultiplexer L34030, and/or a decoder L34040.

The receiver may receive a broadcast signal containing video data, subtitle data, and/or signaling information including metadata about the subtitle data. The receiver may be included in the Demodulation and TP decoding component or the Demux described above.

The demultiplexer may parse the video data, the subtitle data, and/or the signaling information in the received broadcast signal. The demultiplexer may represent the Demux described above.

The decoder may decode the parsed video data, subtitle data, and/or signaling information. The decoder may include the video decoder, the XML parser, and/or the system Info processor described above.

Modules, units, or blocks according to embodiments of the present invention may be processors/hardware executing consecutive processes stored in a memory (or a storage unit). The steps or methods described in the aforementioned embodiments may be performed by the hardware/processors. The methods proposed by the present invention may be executed as code. Such code may be written on a processor-readable storage medium and thus may be read by a processor provided by the apparatuses according to embodiments of the present invention.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

The image processing method according to the present invention may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that processor-readable code is written thereto and executed therefrom in a decentralized manner. Functional programs, code, and code segments needed to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

MODE FOR INVENTION

As described above, a mode for carrying out the invention has been described in the best mode for carrying out the invention.

INDUSTRIAL APPLICABILITY

The present invention is usable throughout the broadcasting industry.

The invention claimed is:

1. A method of processing a broadcast signal in a broadcast transmitter, the method comprising:
   encoding video data that correspond to at least one of SD resolution, HD resolution, and UHD resolution;
   encoding Extensible Mark-up Language (XML) subtitle data having a first aspect ratio,
   wherein the XML subtitle data includes subtitle text and subtitle metadata,
   wherein the subtitle metadata includes high dynamic range (HDR) information of the XML subtitles, and
   wherein the HDR information includes a base Electro-Optical Transfer Function (EOTF) element and a supplementary EOTF element for a dynamic range mapping of an original luminance value of the XML subtitles to a transferred luminance value;
   encoding signaling information including information for identifying the first aspect ratio, wherein an aspect ratio of the XML subtitle data, that is displayed on a screen having a second aspect ratio, is based on the first aspect ratio and the second aspect ratio; and
   generating the broadcast signal containing the video data, the XML subtitle data, and the signaling information; and
   transmitting the broadcast signal.

2. The method according to claim 1, wherein the signaling information further includes maximum and minimum aspect ratio information on the XML subtitle data.

3. The method according to claim 1, wherein the signaling information further includes one of maximum and minimum brightness information on the XML subtitle data, bit depth information on the XML subtitle data, Electro-Optical Transfer Function (EOTF) information applied to the XML subtitle data or color gamut information on the XML subtitle data.

4. The method according to claim 1, wherein the signaling information is included in one of an adaptation field of a Moving Picture Experts Group (MPEG)-2 Transport Stream (TS), Digital Video Broadcasting (DVB) auxiliary data or a header of a transport packet.

5. A method of processing a broadcast signal in a broadcast receiver, the method comprising:
   receiving the broadcast signal containing video data, Extensible Mark-up Language (XML) subtitle data having a first aspect ratio, and signaling information including information for identifying the first aspect ratio,
   wherein the XML subtitle data includes subtitle text and subtitle metadata, wherein the subtitle metadata includes high dynamic range (HDR) information of the XML subtitles, and wherein the HDR information includes a base Electro-Optical Transfer Function (EOTF) element and a supplementary EOTF element for a dynamic range mapping of an original luminance value of the XML subtitles to a transferred luminance value;

demultiplexing the video data, the XML subtitle data and the signaling information from the broadcast signal;

decoding the video data, the XML subtitle data and the signaling information; and displaying the video data and the XML subtitle data on a screen having a second aspect ratio, wherein an aspect ratio of the XML subtitle data, that is displayed on the screen, is based on the first aspect ratio and the second aspect ratio.

6. The method according to claim 5, wherein the signaling information further includes maximum and minimum aspect ratio information on the XML subtitle data.

7. The method according to claim 5, wherein the signaling information further includes one of maximum and minimum brightness information on the XML subtitle data, bit depth information on the XML subtitle data, Electro-Optical Transfer Function (EOTF) information applied to the XML subtitle data or color gamut information on the XML subtitle data.

8. The method according to claim 5, wherein the signaling information is included in one of an adaptation field of a Moving Picture Experts Group (MPEG)-2 Transport Stream (TS), Digital Video Broadcasting (DVB) auxiliary data or a header of a transport packet.

9. A broadcast transmitter for processing a broadcast signal, the broadcast transmitter comprising:

an encoder to encode video data that correspond to at least one of SD resolution, HD resolution, and UHD resolution, Extensible Mark-up Language (XML) subtitle data of XML subtitles having a first aspect ratio, and signaling information including information for identifying the first aspect ratio, wherein an aspect ratio of the XML subtitle data, that is displayed on a screen having a second aspect ratio, is based on the first aspect ratio and the second aspect ratio, wherein the XML subtitle data includes subtitle text and subtitle metadata, wherein the subtitle metadata includes high dynamic range (HDR) information of the XML subtitles, and wherein the HDR information includes a base Electro-Optical Transfer Function (EOTF) element and a supplementary EOTF element for a dynamic range mapping of an original luminance value of the XML subtitles to a transferred luminance value;

a broadcast signal generator to generate the broadcast signal containing the video data, the XML subtitle data, and the signaling information; and a transmitter to transmit the broadcast signal.

10. A broadcast receiver for processing a broadcast signal, the broadcast receiver comprising:

a receiver to receive the broadcast signal containing video data that correspond to at least one of SD resolution, HD resolution, and UHD resolution, Extensible Mark-up Language (XML) subtitle data having a first aspect ratio, and signaling information including information for identifying the first aspect ratio, wherein the XML subtitle data includes subtitle text and subtitle metadata, wherein the subtitle metadata includes high dynamic range (HDR) information of the XML subtitles, and wherein the HDR information includes a base Electro-Optical Transfer Function (EOTF) element and a supplementary EOTF element for a dynamic range mapping of an original luminance value of the XML subtitles to a transferred luminance value;

a demultiplexer to demultiplex the broadcast signal into the video data, the XML subtitle data, and the signaling information;

a decoder to decode the video data, the XML subtitle data, and the signaling information; and a screen to have a second aspect ratio and display the video data and the XML subtitle data, wherein an aspect ratio of the XML subtitle data, that is displayed on the screen, is based on the first aspect ratio and the second aspect ratio.

11. The broadcast transmitter according to claim 9, wherein the signaling information further includes maximum and minimum aspect ratio information on the XML subtitle data.

12. The broadcast transmitter according to claim 9, wherein the signaling information further includes maximum and minimum brightness information on the XML subtitle data, bit depth information on the XML subtitle data, Electro-Optical Transfer Function (EOTF) information applied to the XML subtitle data or color gamut information on the XML subtitle data.

13. The broadcast transmitter according to claim 9, wherein the signaling information is included in one of an adaptation field of a Moving Picture Experts Group (MPEG)-2 Transport Stream (TS), Digital Video Broadcasting (DVB) auxiliary data or a header of a transport packet.

14. The broadcast receiver according to claim 10, wherein the signaling information further includes maximum and minimum aspect ratio information on the XML subtitle data.

15. The broadcast receiver according to claim 10, wherein the signaling information further includes maximum and minimum brightness information on the XML subtitle data, bit depth information on the XML subtitle data, Electro-Optical Transfer Function (EOTF) information applied to the XML subtitle data or color gamut information on the XML subtitle data.

16. The broadcast receiver according to claim 10, wherein the signaling information is included in one of an adaptation field of a Moving Picture Experts Group (MPEG)-2 Transport Stream (TS), Digital Video Broadcasting (DVB) auxiliary data or a header of a transport packet.

* * * * *